United States Patent
Jain

(10) Patent No.: US 10,430,330 B2
(45) Date of Patent: Oct. 1, 2019

(54) HANDLING OF UNALIGNED SEQUENTIAL WRITES

(71) Applicant: Western Digital Technologies, Inc., San Jose, CA (US)

(72) Inventor: Vimal Kumar Jain, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 152 days.

(21) Appl. No.: 15/811,371

(22) Filed: Nov. 13, 2017

(65) Prior Publication Data

US 2019/0114255 A1   Apr. 18, 2019

(51) Int. Cl.
 *G06F 12/02* (2006.01)
 *G06F 12/08* (2016.01)
 (Continued)

(52) U.S. Cl.
 CPC ........ *G06F 12/0246* (2013.01); *G06F 3/0635* (2013.01); *G06F 12/08* (2013.01);
 (Continued)

(58) Field of Classification Search
 CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88;
 (Continued)

(56) References Cited

U.S. PATENT DOCUMENTS

| | | | |
|---|---|---|---|
| 6,578,127 B1 * | 6/2003 | Sinclair | G06F 3/0601 711/154 |
| 7,577,763 B1 * | 8/2009 | Beaman | G06F 3/061 710/6 |

(Continued)

OTHER PUBLICATIONS

Incorporating solid state drives into distributed storage systems; Wacha, Rosie; UC Santa Cruz Electronic Theses and Dissertations; 2012; retrieved from https://escholarship.org/content/qt3b37r7f4/qt3b37r7f4.pdf?t=mhfnug on Aug. 5, 2019 (Year: 2012).*

(Continued)

*Primary Examiner* — Daniel C. Chappell
(74) *Attorney, Agent, or Firm* — Vierra Magen Marcus LLP

(57) ABSTRACT

Storage devices, and methods for use therewith, are described herein. Such storage devices can include flash memory, random access memory (RAM), and a memory controller in communication therewith. To improve write performance, the memory controller is configured to store first and second data, corresponding to consecutive unaligned first and second write commands received within a threshold amount of time of one another from a host, sequentially relative to one another within the flash memory. This can involve temporarily storing a tail portion of the first data in the RAM until after a front portion of the first data is stored in the flash memory, and thereafter (after the second write command is received) using the tail portion of the first data to pre-pad a front portion of the second data when the second data is being stored in the flash memory.

19 Claims, 9 Drawing Sheets

(51) Int. Cl.
*G06F 3/06* (2006.01)
*G06F 12/0871* (2016.01)

(52) U.S. Cl.
CPC .. *G06F 12/0871* (2013.01); *G06F 2212/7203* (2013.01); *G06F 2212/7208* (2013.01)

(58) Field of Classification Search
CPC ...... G06F 2003/0691–0698; G06F 2009/3883; G06F 2009/45562–45595; G06F 2201/00–885; G06F 2209/00–549; G06F 2211/00–902; G06F 2212/00–7211; G06F 2213/00–2213/4004; G06F 2216/00–17; G06F 2221/00–2153; G11C 11/00–5692; G11C 13/00–06; G11C 15/00–06; G11C 16/00–3495; G11C 17/00–18; G11C 2216/00–30
See application file for complete search history.

(56) References Cited

U.S. PATENT DOCUMENTS

| | | | |
|---|---|---|---|
| 8,626,987 B2 | 1/2014 | Jung et al. | |
| 8,832,330 B1 * | 9/2014 | Lancaster | H04L 43/0852 710/18 |
| 8,832,366 B1 * | 9/2014 | Huynh | G06F 12/0868 711/113 |
| 8,924,631 B2 | 12/2014 | Ng et al. | |
| 9,229,876 B2 | 1/2016 | Slepon | |
| 9,582,435 B2 | 2/2017 | Jain et al. | |
| 9,703,491 B2 | 7/2017 | Mathur et al. | |
| 9,858,289 B2 * | 1/2018 | Ioannou | G06F 16/178 |
| 2006/0224823 A1 * | 10/2006 | Morley | G06F 3/0613 711/113 |
| 2009/0313426 A1 * | 12/2009 | See | G06F 3/0613 711/112 |
| 2012/0089765 A1 * | 4/2012 | Huang | G06F 3/061 711/103 |
| 2013/0007381 A1 * | 1/2013 | Palmer | G06F 12/0246 711/154 |
| 2013/0073784 A1 * | 3/2013 | Ng | G06F 12/0246 711/103 |
| 2013/0326169 A1 | 12/2013 | Shaharabany et al. | |
| 2014/0164681 A1 * | 6/2014 | Ravimohan | G06F 12/023 711/103 |
| 2014/0310500 A1 * | 10/2014 | Kaplan | G06F 12/1009 711/206 |
| 2015/0186270 A1 | 7/2015 | Peng et al. | |
| 2016/0162203 A1 | 6/2016 | Grimsrud | |

OTHER PUBLICATIONS iBridge: Improving Unaligned Parallel File Access with Solid-State Drives; Zhang et al.; IEEE 27th International Symposium on Parallel and Distributed Processing; May 20-24, 2013 (Year: 2013).*

* cited by examiner

HANDLING OF UNALIGNED SEQUENTIAL WRITES

PRIORITY CLAIM

This application claims priority to Indian Provisional Patent Application No. 201741037005, filed Oct. 18, 2017, which is incorporated herein by reference.

BACKGROUND

When a host device writes data to and reads data from a storage device, the host writes and reads data in terms of logical block addresses (LBAs), each of which is mapped to 512 bytes (or some other predetermined length) of physical memory. However, a Flash Transfer Layer (FTL) or Media Management Layer (MML) of the storage device manages the data in terms logical groups (LGs) in the flash (non-volatile) memory of the storage device, in order to limit control structure overhead. These LGs are further broken into sub-LGs, which can also be referred to as flash management units (FMUs), with each of the FMUs typically being mapped to 4096 bytes of physical memory. In such a configuration, each of the FMUs can include or correspond to 4096 bytes that are separated into eight 512 byte logical sub-units, with each of the logical sub-units having a corresponding LBA that can be used by the host device to address the logical sub-unit. An FMU is the minimal addressable logical unit of memory that can be addressed. Since a partial FMU cannot be written to, data that a host wants to store in the non-volatile memory may sometimes need to be pre-padded and/or post-padded before the data is stored in the non-volatile memory, as explained in more detail below. The flash management units (FMUs) can also be referred to more specifically as logical flash management units (LFMUs), or more succinctly as logical units.

When a host device issues a write command to a storage device, the host device specifies an initial LBA at which to begin storing the data to be written in the flash (non-volatile) memory of the storage device. When the initial LBA is unaligned with a boundary of one of the FMUs, then a controller of the storage device may need to pre-pad the data (e.g., with dummy data) before the data to be written in response to the write command is stored within the non-volatile memory of the storage device. Further, when the end of the data to be written in response to the write command is unaligned with a boundary of one of the FMUs, then the controller of the storage device may need to post-pad the data (e.g., with dummy data) before the data to be written in response to the write command is stored within the non-volatile memory of the storage device.

In order to optimize read/write performance, and preferably minimize fragmentation and write amplification, the controller of the storage device classifies data that is being written into sequential data, which can also be referred to as a sequential stream, or random data, which can also be referred to as a random stream. Typically, relatively small and unaligned writes are classified as and stored as random data, whereas larger and aligned writes are classified and stored as sequential data.

A host device typically uses a file system, such as File Allocation Table 32 (FAT32), exFAT, ext2/3, and Hierarchical File System Plus (HFS+), or other known host file systems, to address files and store information about files in a storage device. Accordingly, a storage device will typically need to be capable of being used with various different types of file systems. This sometimes results in a storage device having poor write performance due to excessive pre-padding and/or post-padding of small chunks of data, and classifying and storing data as random data, even where a host was attempting to write a large continuous block of data.

BRIEF DESCRIPTION OF THE DRAWINGS

FIG. 6 is also used to explain how such unaligned sequential write commands may be handled in a manner that provides for poor write performance. FIG. 6 is further used to explain how embodiments of the present technology can handle unaligned sequential write commands in a manner that improves write performance.

DETAILED DESCRIPTION

Figure 1:
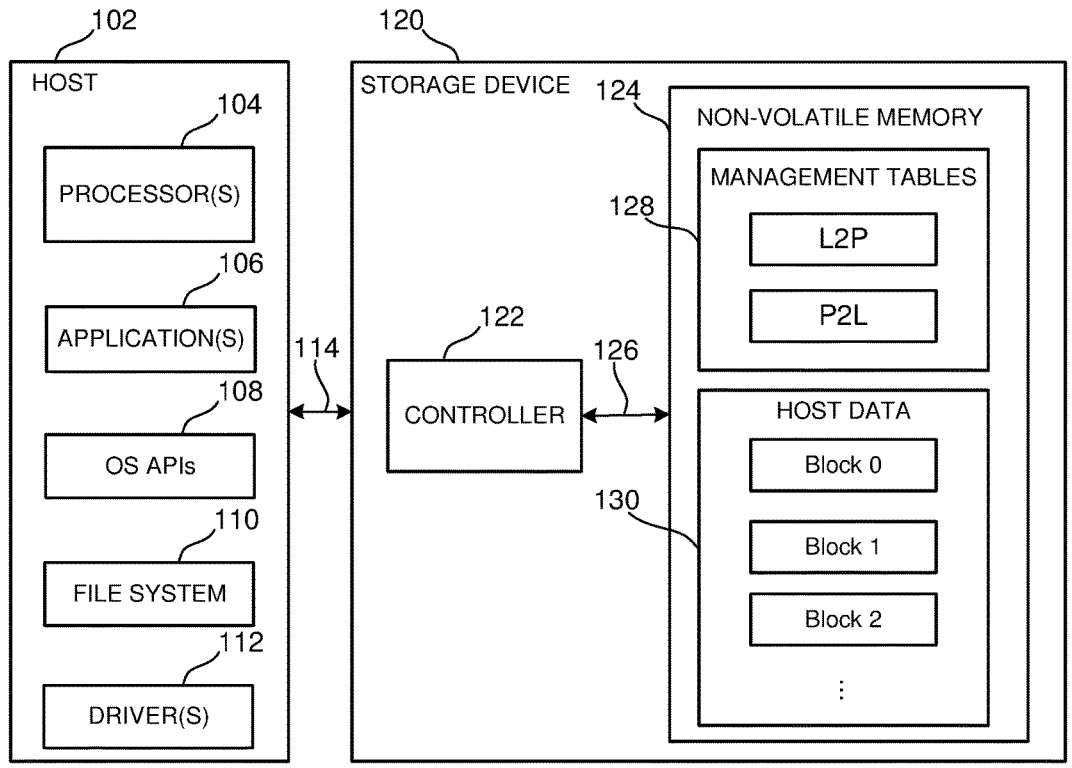
FIG. 1 is a block diagram depicting one embodiment of a storage device connected to a host device (or embedded in the host device) that can implement embodiments of the present technology described herein.

Storage devices, and methods for use therewith, are described herein. Such storage devices can include flash memory (non-volatile memory), random access memory (RAM), and a memory controller in communication with the flash memory and the RAM. In accordance with certain embodiments of the present technology, the memory controller of a storage device is configured to store first and second data, corresponding to consecutive unaligned first and second write commands received within a threshold amount of time of one another from a host, sequentially relative to one another within the flash memory. Such embodiments can involve temporarily storing a tail portion of the first data in the RAM until after a front portion of the first data is stored in the flash memory, and thereafter (after the second write command is received) using the tail portion of the first data to pre-pad a front portion of the second data when the second data is being stored in the flash memory.

Such embodiments can be used to significantly improve the write performance of storage devices when they are responsive to consecutive unaligned sequential write commands received from a host. Exemplary systems and sub-system that can be used to implement such embodiments of the present technology are described below, e.g., with reference to FIGS. 1, 2, 3 and 4.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a three digital reference number, and the first two digits of a four digit reference number, identifies the drawing in which the reference number first appears.

FIG. 1 is a block diagram depicting one embodiment of a storage device 120 connected to a host device 102 (or embedded in the host device 102) that can implement embodiments of the present technology described below. Referring to FIG. 1, the host device 102 stores data into, and retrieves data from, the storage device 120 by issuing write and read commands. The storage device 120 may be embedded in the host device 102 or may exist in the form of a card, universal serial bus (USB) drive, or other removable drive, such as a solid state disk (SSD) that is removably connected to the host device 102 through a mechanical and electrical connector. The host device 102 may be any of a number of fixed or portable data generating devices, such as a personal computer, a smartphone, a personal digital assistant (PDA), a server, a set top box, or the like. More generally, the host device 102 can include host logic that performs the functions of a smartphone, PDA, laptop, server, set top box, etc. While not specifically shown, the host can include and/or be in communication with read only memory (ROM).

The host device 102, which can be referred to more succinctly as the host 102, may include one or more processors 104 that runs one or more application programs 106. The application programs 106, when data is to be stored on or retrieved from the storage device 120, communicate through one or more operating system application programming interfaces (APIs) 108 with a file system 110. The file system 110 may be a software module executed on the processor(s) 104 and manages the files in the storage device 120. The file system 110 manages clusters of data in logical address space. Common operations executed by a file system 110 include operations to create, open, write (store) data, read (retrieve) data, seek a specific location in a file, move, copy, and delete files. The file system 110 may be circuitry, software, or a combination of circuitry and software.

Accordingly, the file system 110 may be a stand-alone chip or software executable by the processor(s) 104 of the host 102. A storage device driver 112 on the host 102 can translate instructions from the file system 110 for transmission over a communication channel 114 between the host 102 and the storage device 120. The interface for communicating over the communication channel 114 may be any of a number of known interfaces, such as SD, MMC, USB storage device, SATA and SCSI interfaces. A file system data structure, such as a file allocation table (FAT), may be stored in memory (e.g., 124 or 206) of the storage device 120. The host 102 may utilize the file system data structure to maintain a logical address range for all logical block addresses (LBAs) that have been assigned by the host 102 to data. In addition to being used to refer to the communication channel between the host 102 and the storage device 120, the reference number 114 can also be used to refer to host interface signals that are communicated over the communication channel 114.

The host device 102, which can also be referred to more succinctly as the host 102, uses the file system 110 to address files stored within the storage device 120, which can involve writing data to and reading data from the non-volatile memory 124 of the storage device 120. Exemplary types of file systems that can be used by the host 120 include, but are not limited to, FAT32, exFAT, ext2/3, HFS+, as noted above. The storage device 120 will typically be designed to work with different types of hosts, each of which may use a different type of file system. This may result in the storage device 120 having poor write performance due to excessive pre-padding and/or post-padding of small chunks of data, and classifying and storing host data as random data, even where the host 120 was attempting to write a large continuous block of data.

The storage device 120 includes a controller 122 (which can also be referred to as the memory controller 122) in communication with the non-volatile memory 124 via signals 123. The reference number 123 can also be used to refer to a communication channel between the controller 122 and the non-volatile memory 124. Note that FIG. 1 shows a logical depiction of the non-volatile memory 124. In one embodiment, the non-volatile memory 124 can be implemented using one or multiple memory die. The non-volatile memory 124 can include management tables 128 and host data 130. In one embodiment, management tables 128 includes L2P tables (logical to physical mappings) and P2L tables (physical to logical mappings). The controller 122 can use the management tables 128 to map logical block addresses (LBAs) to physical block addresses (PBAs). Such tables 128 can be used to directly map LBAs to the PBAs, or LBAs can be mapped to intermediate or virtual block addresses, which are mapped to PBAs. Other variations are also possible. In one embodiment, the host data 130 is stored in blocks (e.g., Block 0, Block 1, Block 2, . . . ). In some example embodiments, a block of non-volatile memory cells is the unit of erase. In some embodiments, a block represents a plurality of memory cells grouped by common bit lines and word lines. Instructions or commands, such as write commands, that are sent from the host 102 to the storage device 120 over the communication channel 114 may include logical block addresses (LBAs). By contrast, instructions or commands that are sent over the communication channel 123 may include physical block addresses (PBAs).

The individual blocks (e.g., Block 0, Block 1, Block 2, . . . ) of the host data 130 may be divided for operational purposes into pages of memory cells. The memory cells of each of the blocks, for example, can each be divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage, can for example, be formed of one physical page from each of the four blocks (e.g., a metapage can for example includes the page P2 in each of the four blocks but the pages of a metapage need not necessarily have the same relative position within each of the blocks). A metapage may be the maximum unit of programming.

In accordance with embodiments of the present technology, a flash management unit ("FMU") is a smallest data chunk that the host 102 can use to read or write to the non-volatile memory 124, which can also be referred to as the flash memory 124. Each page may have any number of FMU's. For example, page P0 may have 1, 2, 4, or 8 FMUs in exemplary embodiments. FMUs are discussed in more detail below, e.g., with reference to FIG. 5.

Memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material.

When the host device 102 performs a defragmentation of the host data 130 in non-volatile memory 124, the host device 102 sends a command to move host data from a source logical address to a destination logical address, or to move host data from multiple source logical addresses to multiple destination logical addresses. In response to a command to move host data, the controller 122 updates logical to physical mappings (L2P tables) and updates one or more physical to logical mappings (P2L tables).

Figure 2:
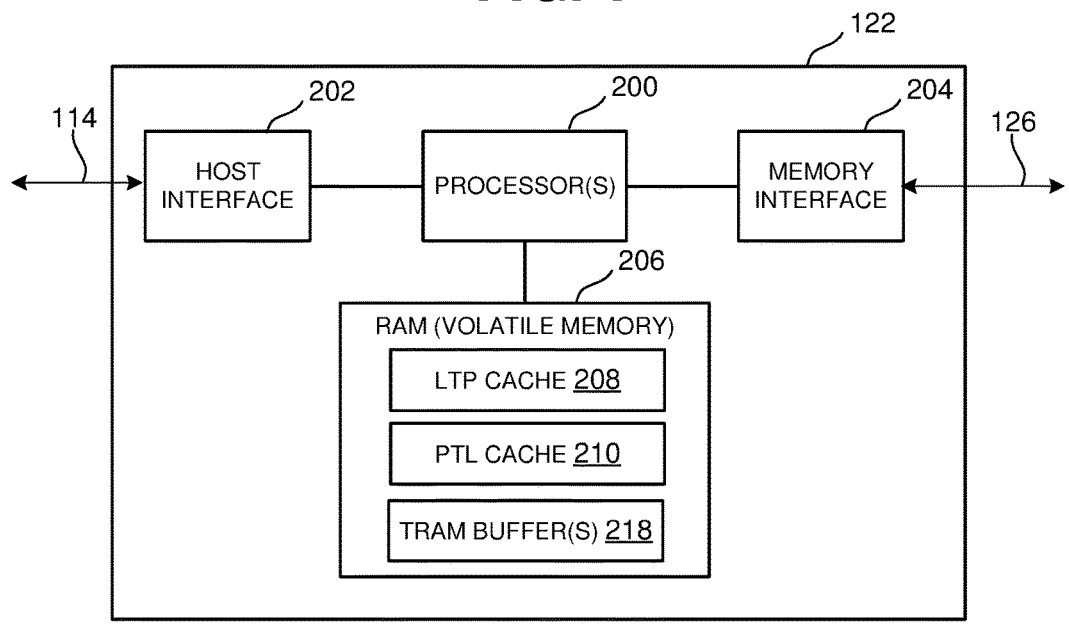
FIG. 2 is a block diagram of one example embodiment of the hardware architecture for a controller of the storage device, introduced in FIG. 1, that can implement certain embodiments of the present technology described herein.

FIG. 2 is a block diagram of one example embodiment of the hardware architecture for the controller 122 that can be used to implement the technology described herein. The controller 122 includes one or more processors 200 in communication with a host interface 202 and a memory interface 204. The host interface 202 communicates with the host device 102 via host interface signals 114. In one embodiment, the host interface 202 is a Multi Media Card (MMC) interface. In another embodiment, the host interface 202 is a Universal Flash Storage (UFS) interface. The memory interface 204 communicates with the non-volatile memory 124 via signals 123 and can be any suitable interface including Toggle Mode 200, 400 or 800. The processor(s) 200 are also in communication with random access memory (RAM) 206, which is a local volatile memory for the controller 112, and thus, can also be referred to as controller RAM 206. The RAM 206 can be any type of volatile storage (e.g., DRAM, SRAM, etc.). In one embodiment, the RAM 206 stores code (software and/or firmware) that programs the processor(s) 200 to perform the functions described below for managing the storage device 120, including handling consecutive unaligned write commands received from the host 120 in a manner that provides for good write performance. In another embodiment, one or more processor(s) 200 include custom hardware (FPGAs, ASICS, etc.), with or without software, to perform the functions described below for managing the storage device 120, including handling consecutive unaligned write commands received from the host 120 in a manner that provides for good write performance.

The storage device 120 may include functions for memory management. In operation, the processor(s) 200 may execute memory management instructions (which may be resident in instructions) for operation of the memory management functions. The memory management functions may control the assignment of the one or more portions of the memory within storage device 120, such as the controller RAM 206. For example, memory management functions may allocate a portion of the controller RAM 206 for a data cache. One, some, or all of the memory management functions may be performed by one or separate elements within the storage device 120. The controller RAM 206 may include one or more transfer RAM buffers 218 for use in improving write performance. As explained in greater detail below, in accordance with certain embodiments of the present technology, when the beginning or end of data that is being written from the host 102 to the flash memory 124 is unaligned with boundaries of flash management units (FMUs), then the transfer RAM buffer(s) 218 can store at least a portion of the data to allow for pre-padding and/or post-padding before the portion of the data is stored in the flash memory 124. One or more portions of the controller RAM 206 may also be used to cache copies of the management tables 128, or portions thereof, to enable the controller 122 to perform logical to physical (LTP) and physical to logical (PTL) address translations much faster than if the controller 122 needed to always access the management tables 128 stored in the non-volatile memory. For example, as shown in FIG. 2, the controller RAM 206 can include an LTP cache 208 that can store one or more tables (or portions thereof) that are used for LTP translations, and a PTL cache 210 that can store one or more tables (or portions thereof) that are used for PTL translations.

Figure 3:
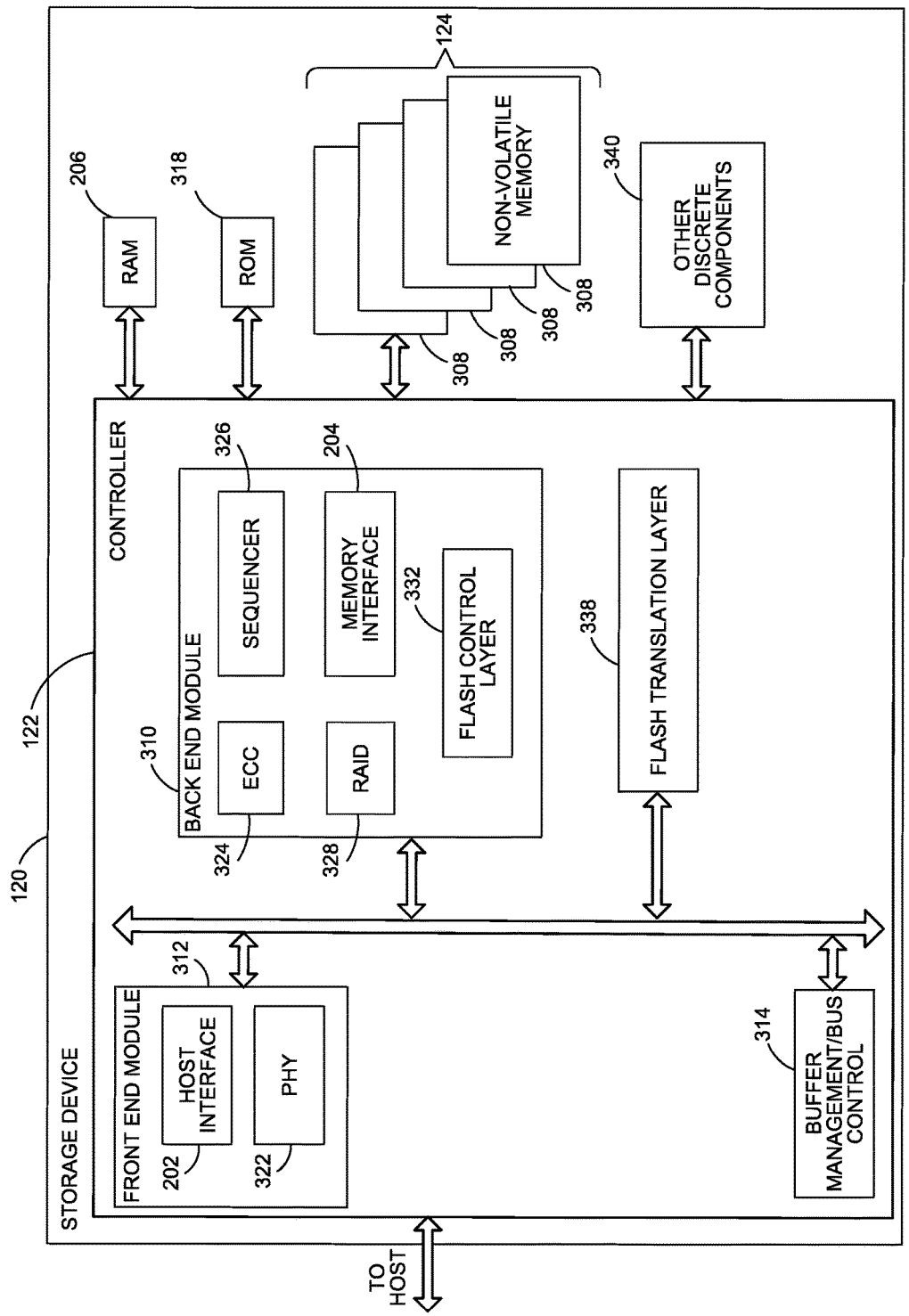
FIG. 3 is a block diagram of one example of a storage device.

FIG. 3 is a block diagram of one example embodiment of the storage device 120. However, the architecture depicted in FIG. 3 can also be used to implement other types of non-volatile storage devices. FIG. 3 shows that the storage device 120 includes the controller 122 connected to one or more non-volatile memory die 308 (which comprise the non-volatile memory 124 depicted in FIG. 1). FIG. 3 provides details of some of the software components of the controller 122, which will be discussed in more detail below.

As used herein, for a system that uses non-volatile memory, the controller 122 is a device that manages data stored on the non-volatile memory and communicates with a host. The controller 122 can have various functionality in addition to the specific functionality described herein. For example, the controller 122 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. That firmware can also be read into local volatile memory during operation. When a host needs to read data from or write data to the non-volatile memory, it will communicate with the controller 122. If the host provides a logical address to which data is to be read/written, the controller 122 converts the logical address received from the host to a physical address in the physical flash memory. The controller 122 can also perform various memory management functions, such as, but not limited to, wear leveling (distributing write operations among memory die or blocks of the memory to avoid wearing out specific blocks of memory that would otherwise be repeatedly written to) and garbage collection (after a block is full, moving only the valid pages of data to a new block, so the full block can be erased and reused).

The interface between controller 122 and the non-volatile memory die 308 may be any suitable flash interface, such as Toggle Mode 200, 400, or 800. In some embodiments, the storage device 120 includes a single channel between the controller 122 and the non-volatile memory die 308; however, the subject matter described herein is not limited to having a single memory channel. For example, in some memory system architectures two, four, eight or more channels may exist between the controller 112 and the memory die 308, depending on controller capabilities. In any of the embodiments described herein, more than a single channel may exist between the controller 122 and the memory die 308, even if a single channel is shown in the drawings.

As depicted in FIG. 3, the controller 122 includes a front end module 312 that interfaces with a host, a back end module 310 that interfaces with the one or more non-volatile memory die 308, and various other modules that perform functions which will now be described.

The components of the controller 122 depicted in FIG. 3 may take the form of a packaged functional hardware unit (e.g., an electrical circuit) designed for use with other components, program code (e.g., software or firmware) executable by one or more processors or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., local volatile memory) to program a processor to perform the functions described herein.

The storage device 120 includes random access memory (RAM) 206 (same local volatile memory as discussed above with respect to FIG. 2) and read only memory (ROM) 318. Referring again to the modules of the controller 122, a buffer manager/bus control 314 manages the RAM 206 and controls the internal bus arbitration of the controller 122. The ROM 318 stores boot code for the controller. Although illustrated in FIG. 3 as located separately from the controller 122 (but connected to controller 122), in other embodiments one or both of the RAM 216 and the ROM 318 may be located within the controller. In yet other embodiments, portions of the RAM and the ROM may be located both within the controller and outside the controller. Further, in some implementations, the controller 122, the RAM 206, and the ROM 318 may be located on separate semiconductor die.

The front end module 312 includes the host interface 202 (introduced in the discussion of FIG. 2) and a physical layer interface (PHY) 322 that provide the electrical interface with the host or next level storage controller. The choice of the type of host interface 202 can depend on the type of memory being used. Exemplary types of the host interfaces 202 include, but are not limited to, SATA, SATA Express, SAS, Fibre Channel, USB, PCIe, MMC, UFS and NVMe. The host interface 202 typically facilitates transfer for data, control signals, and timing signals. In one embodiment, the front end module 312 provides the single communication interface adapted to communicate with an external computing device (e.g., host) for the controller 122 and the memory die 308 of the storage device 120.

The back end module 310 includes an error correction code (ECC) engine 324 that encodes the data bytes received from the host, and decodes and error corrects the data bytes read from non-volatile memory die 308. A command sequencer 326 generates command sequences, such as program and erase command sequences, to be transmitted to the non-volatile memory die 308. A RAID (Redundant Array of Independent Dies) module 328 manages generation of RAID parity and recovery of failed data. The RAID parity may be used as an additional level of integrity protection for the data being written into the non-volatile memory 124. In some cases, the RAID module 328 may be a part of the ECC engine 324. Note that the RAID parity may be added as an extra die or dies, but it may also be added within the existing die, e.g. as an extra plane, or extra block, or extra WLs within a block. The memory interface 204 (introduced in the discussion of FIG. 2) provides the command sequences to the non-volatile memory die 308 and receives status information from the non-volatile memory die 308. In one embodiment, the memory interface 204 may be a double data rate (DDR) interface, such as a Toggle Mode 200, 400, or 800 interface. A flash control layer 332 controls the overall operation of back end module 310.

Additional components of the storage device 120 illustrated in FIG. 3 include a Flash Translation Layer (FTL) or Media Management Layer (MML) 338, which performs wear leveling of memory cells of the non-volatile memory die 308. The storage device 120 also includes other discrete components 340, such as external electrical interfaces (e.g., as part of the host interface and the memory interface), external RAM, resistors, capacitors, or other components that may interface with the controller 122. In alternative embodiments, one or more of the physical layer interface 322, the RAID module 328, the media management layer 338 and the buffer management/bus controller 314 are optional components that are not necessary in the controller 122.

The Flash Translation Layer (FTL) or Media Management Layer (MML) 338 may be integrated as part of the flash management that may handle errors and interfacing with the host. In particular, the FTL 338 is responsible for the internals of non-volatile memory management. In particular, the FTL 338 may include an algorithm in the memory device firmware which translates writes from the host into writes to the memory of a memory die 308. The FTL 338 may be needed because: 1) the memory may have limited endurance; 2) the memory may only be written in multiples of pages; and/or 3) the memory may not be written unless it is erased as a block. FTL 338 understands these potential limitations of the memory which may not be visible to the host. Accordingly, the FTL 338 attempts to translate the writes from host into writes into the non-volatile memory 124, which can be flash memory. The MML 238 also manages the process for mapping between logical addresses from the host and physical addresses on the memory die 308. This can includes updating the L2P tables and the P2L tables during programming, erasing and performing move commands.

Figure 4:
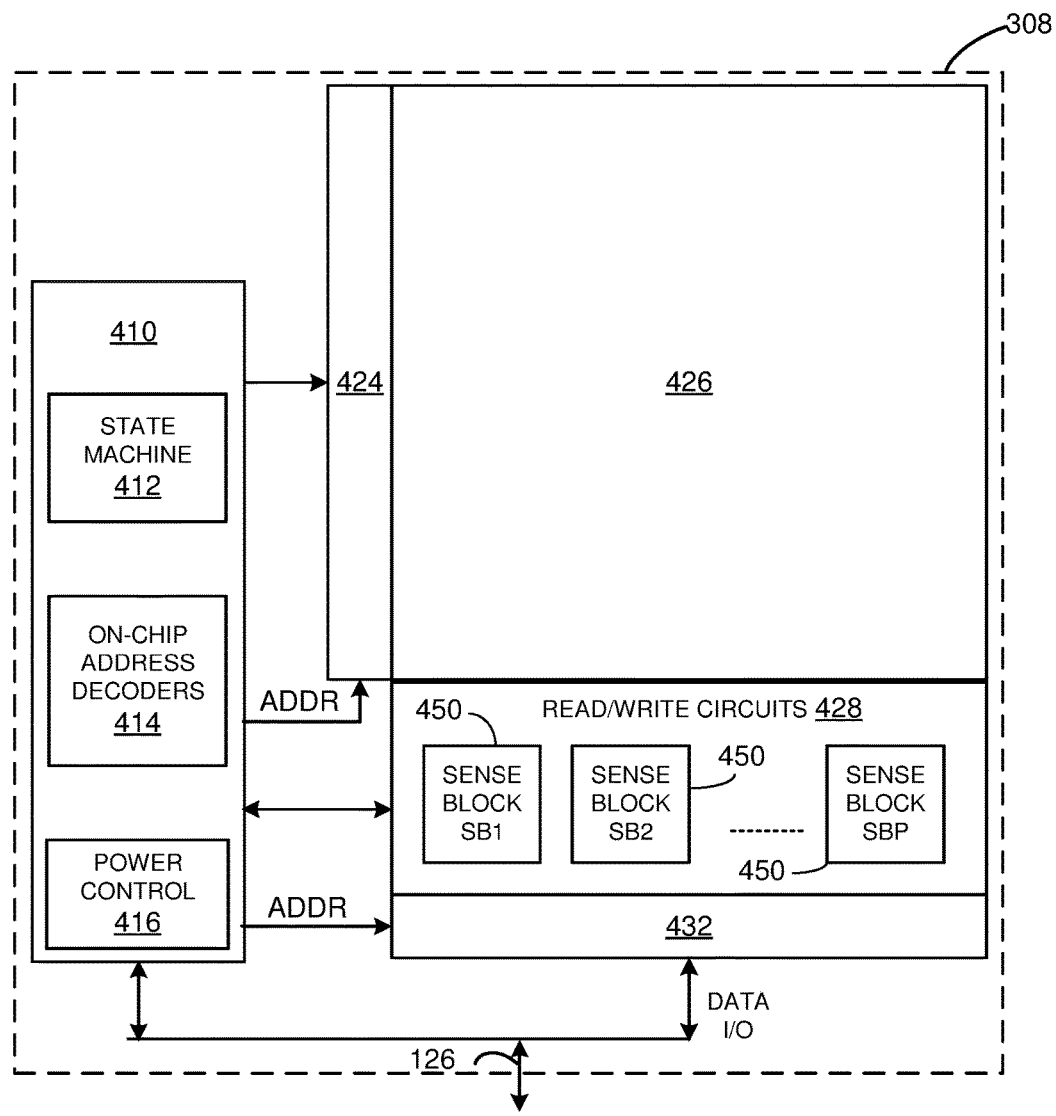
FIG. 4 is a block diagram of one example of a non-volatile memory die.

FIG. 4 is a functional block diagram of an example memory die 308. The components depicted in FIG. 4 are electrical circuits. In one embodiment, the memory die 308 includes a monolithic three dimensional memory structure 426 of non-volatile memory cells, control circuitry 410, and read/write circuits 428. In other embodiments, a two dimensional array of memory cells can be used. The memory structure 426 is addressable by word lines via a row decoder 424 and by bit lines via a column decoder 432. The read/write circuits 428 include multiple sense blocks 450 including SB1, SB2, ..., SBp (sensing circuitry) and allow a page of memory cells to be read or programmed in parallel. Commands and data are transferred between the controller 122 and the memory die 308 via signal lines 123. In one embodiment, the memory die 308 includes a set of input and/or output (I/O) pins that connect to the signal lines 123.

One embodiment of the memory structure 426 comprises a monolithic three dimensional memory structure in which multiple memory levels are formed above (and not in) a single substrate, such as a wafer, with no intervening substrates. The memory structure 426 may comprise any type of non-volatile memory that is monolithically formed in one or more physical levels of arrays of memory cells having an active area disposed above a silicon substrate. In one embodiment, the memory structure 426 implements three dimensional NAND flash memory. One example of three dimensional NAND flash memory can be found in U.S. Pat. No. 9,548,130, incorporated herein by reference in its entirety. Other embodiments include two dimensional NAND flash memory, two dimensional NOR flash memory, ReRAM cross-point memory, magnetoresistive memory (e.g., MRAM), phase change memory (e.g., PCRAM), and others.

The control circuitry 410 cooperates with the read/write circuits 428 to perform memory operations (e.g., erase, program, read, and others) on the memory structure 426, and includes a state machine 412, an on-chip address decoder 414, and a power control module 416. The state machine 412 provides die-level control of memory operations. In one embodiment, the state machine 412 is programmable by software. In other embodiments, the state machine 412 does not use software and is completely implemented in hardware (e.g., electrical circuits). In one embodiment, the control circuitry 410 includes registers, ROM fuses and other storage devices for storing default values such as base voltages and other parameters. The on-chip address decoder 414 provides an address interface between addresses used by the host 102 or the controller 122 to the hardware address used by the decoders 424 and 432. The power control module 416 controls the power and voltages supplied to the word lines and bit lines during memory operations. It can include drivers for word lines, selection transistors, source lines, and other components. The power control module 416 may include charge pumps for creating voltages. The sense blocks 450 include bit line drivers.

Any one or any combination of the control circuitry 410, the state machine 412, the decoders 414/424/432, the power control module 416, the sense blocks 450, the read/write circuits 428, and the controller 122 can be considered one or more control circuits that performs the functions described herein.

Multiple memory elements in the memory structure 426 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within the memory structure 426. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. One example memory system is a three dimensional memory structure that includes vertical NAND strings with charge-trapping material. Three dimensional memory arrays may also be designed in a NOR configuration.

The memory structure 426 can also be ReRAM cross point memory. One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

The memory structure 426 can also be Magnetoresistive memory (MRAM), which stores data by magnetic storage elements. In one example, the elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

The memory structure 426 can also be phase change memory (PCRAM), which exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave. The memory structure 426 includes many blocks of memory cells. A person of ordinary skill in the art will recognize that the technology described herein is not limited to a single specific memory structure, but covers many relevant memory structures within the spirit and scope of the technology as described herein and as understood by one of ordinary skill in the art.

Figure 5:
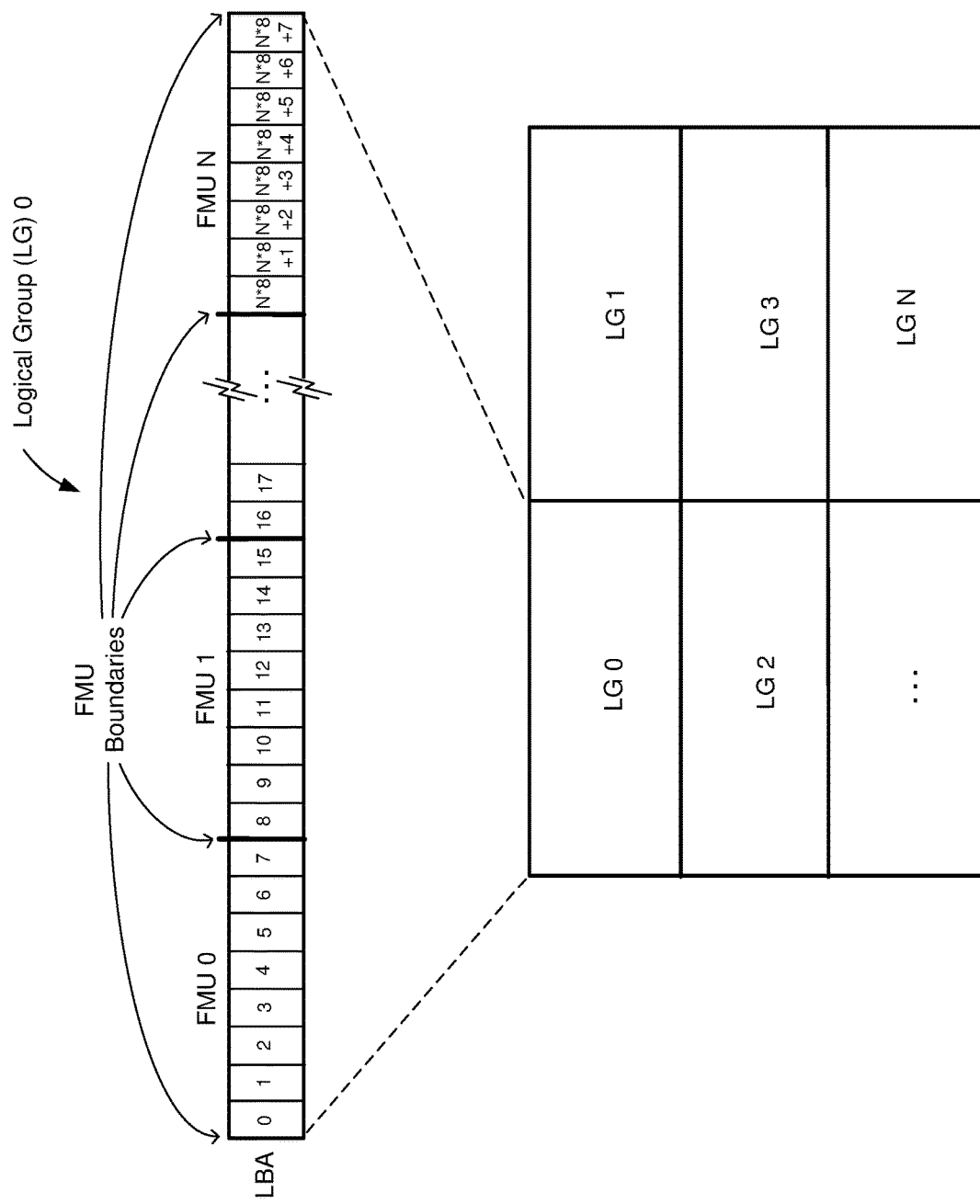
FIG. 5 conceptually illustrates how from a perspective of an FTL of a memory controller, non-volatile memory can be logically separated into logical groups, each of which can be further broken into sub-LGs, which can also be referred to as flash management units (FMUs), which each of the FMUs typically being mapped to a block of (e.g., 4096 bytes worth of) physical memory.

Referring briefly back to FIG. 1 again, a logical address that the controller 122 receives from the host 102 can be referred to more specifically as a logical block address (LBA). As noted above, each LBA corresponds to a logical sub-unit that maps to a unit of physical memory of a predetermined length (e.g., 512 bytes). Such a unit of physical memory can be addressed by a physical block address (PBA). The controller 122 can use one or more tables (e.g., 128) to map LBAs to PBAs. Such table(s) can be used to directly map LBAs to the PBAs, or LBAs can be mapped to intermediate or virtual block addresses, which are mapped to PBAs. Other variations are also possible. The Flash Transfer Layer (FTL) or Media Management Layer (MML) 338 may manage the data in terms logical groups (LGs) in the flash (non-volatile) memory 124 of the storage device 120, in order to limit control structure overhead. Referring briefly to FIG. 5, FIG. 5 illustrates how (from the standpoint of the host 102) flash memory (e.g., 124) can be logically separated into logical groups, labeled LG 0, LG 1, LG 2 . . . LG N. These LGs are further broken into sub-LGs, which can also be referred to as flash management units (FMUs). The flash management units can also be referred to more specifically as logical flash management units (LF-MUs), or more succinctly as logical units. The entirety of the logical groups (LGs) can correspond to the entirety of a logical address space, which is divided into LGs or logical address ranges, with each LG divided into an equal number of FMUs.

Each of the FMUs can be mapped to 4096 bytes (or some other chunk) of physical memory. Thus, in such a configuration, each of the FMUs can correspond to 4096 bytes and be separated into eight 512 byte logical sub-units, with each of the logical sub-units having a corresponding LBA that can be used by a host to address the logical sub-unit, which is mapped to a unit of physical memory by the controller 122. More specifically, each FMU may include eight sequential and contiguous LBAs.

FIG. 5 illustrates how LG 0 can be logically separated into FMUs, labeled FMU 0, FMU 1 FMU N. FIG. 5 also illustrates how each of the FMUs can be separated into eight sub-units, each of which corresponds to an LBA. For example, the eight sub-units of FMU 0 are shown as corresponding to LBAs 0 through 7, the eight sub-units of FMU 1 are shown as corresponding to LBAs 8 through 15, and the eight sub-units of FMU N are shown as corresponding to LBAs N*8 through (N*8)+7. While not shown in FIG. 5, the eight sub-units of FMU 2 would corresponding to LBAs 16 through 23, and the eight sub-units of FMU 3 would corresponding to LBAs 24 through 31, etc. FIG. 5 also shows various boundaries of the FMUs. For example, the boundaries of the FMU 0 are the beginning of the LBA 0 and the boundary between LBAs 7 and 8 (which can also be referred to as the end of the LBA 7); and the boundaries of the FMU 1 are the boundary between LBAs 7 and 8 (which can also be referred to as the beginning of the LBA 8) and the boundary between LBAs 15 and 16 (which can also be referred to as the end of the LBA 15). More generally, the boundaries of an FMU correspond to the beginning and end of the FMU.

When the host 102 issues a write command to the storage device 120, the host 102 specifies an initial LBA at which to begin storing data in the flash (non-volatile) memory 124 of the storage device 120. The write command can additionally specify the length of the data to be stored, which enables the controller 122 to determine how many LBAs are to be used to store the data in the flash memory 124, which can also be referred to herein as the non-volatile memory 124. For example, a write command can specify that the host wants to write 8192 byes of data, starting at LBA 1. It is also possible that the host 102, in a write command, specifies that data is to be written to a specific quantity of LBAs (e.g., sixteen LBAs), starting at a specific LBA (e.g., starting at LBA 1). This is essentially the same as the host indicating that it wants to write 8192 bytes of data, if each of the LBAs correspond to 512 bytes, since 516*16=8192 bytes. As the terms are used herein, 4096 bytes can also be referred to as 4 kilobytes (kB), and 8192 byes can also be referred to as 8 kB.

When the initial LBA specified in a write command is unaligned with a boundary of one of the FMUs, then a controller 122 of the storage device 120 will need to pre-pad the data (e.g., with dummy data) before the data to be written in response to the write command is stored within the non-volatile memory 124 of the storage device 120. This is because a partial FMU cannot be written to. Further, when the end of the data to be written in response to the write command is unaligned with a boundary of one of the FMUs, then the controller 122 of the storage device 120 may need to post-pad the data (e.g., with dummy data) before the data to be written in response to the write command is stored within the non-volatile memory 124 of the storage device 120. This is also because a partial FMU cannot be written to. When a write command specifies that data is to be written such that the start of the data will be unaligned with a boundary of one of the FMUs (because the initial LBA specified in the write command is unaligned with a boundary of one of the FMUs), such a write command can be referred to as an unaligned write command. Also, when a write command specifies that data is to be written such that the end of the data will be unaligned with a boundary of one of the FMUs, such a write command also can be referred to as an unaligned write command. By contrast, when a write command specifies that data is to be written such that the start and the end of the data will be aligned with FMU boundaries (which can be boundaries of the same or separate FMUs, depending upon the length of the data to be written), such a write command can be referred to as an aligned write command In order for a write command to be an aligned write command, the initial LBA specified in the write command must be aligned with an FMU boundary, and the length of the data must be equal to the length of an FMU or a multiple thereof.

Figure 6:
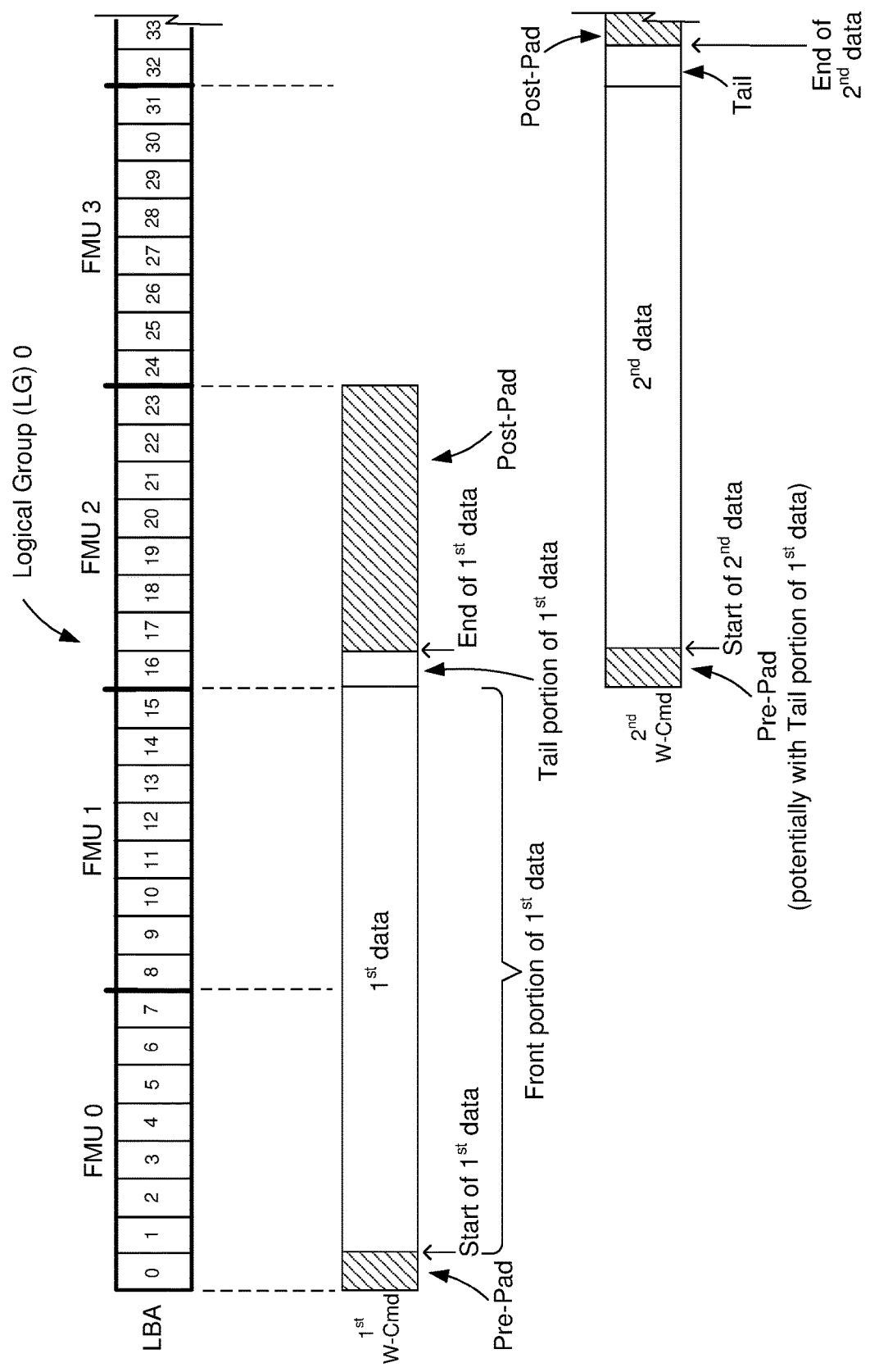
FIG. 6 conceptually illustrates how consecutive unaligned sequential write commands can be received by a memory controller from a host device.

Continuing with the above example, assume the host 102 issues a write command to the storage device 120 specifying that the host 102 wants to write 8192 bytes of data (or equivalently, sixteen LBAs worth of data), starting at LBA 1. Such a write command, for the purpose of labeling and discussion, is shown in FIG. 6 and referred to as a $1^{st}$ write command ($1^{st}$ w-cmd). As can be appreciated from FIG. 6, since the start of the $1^{st}$ data and the end of the $1^{st}$ data would be unaligned with FMU boundaries, this $1^{st}$ write command is an example of an unaligned write command More specifically, it can be seen in FIG. 6 that the start of the $1^{st}$ data is offset from a starting boundary of FMU 0 by one LBA, and the end of the $1^{st}$ data is offset from the boundary between FMUs 1 and 2 by one LBA. By contrast, if a write command specified the host wanted to write 8192 bytes of data starting at LBA 0, or starting LBA 8, then the data would be aligned with the boundaries of the FMUs, and thus, is an example of an aligned write command.

Because an FMU is the minimal addressable logical unit of memory that can be addressed, the controller 122 needs to pre-pad the $1^{st}$ data, and more specifically the LBA 0 of the FMU 0, before the front portion of the $1^{st}$ data (corresponding to the LBAs 1 through 15 in this example) can be stored in non-volatile memory 124. Similarly, the controller 122 needs to post-pad the $1^{st}$ data (potentially to fill the LBAs 17 through 23 of the FMU 2), before the end portion of the 1st data (corresponding to the LBA 16 in this example) can be stored in non-volatile memory 124. This end portion of the $1^{st}$ data can also be referred to as a tail portion, or more succinctly, as the tail of the $1^{st}$ data. Where the pre-padding and/or post-padding is performed using dummy data, this reduces the write performance of the storage device 120. Additionally, processing of the write command in a conventional manner may result in the tail portion of the $1^{st}$ data (which in this example is the end portion of the $1^{st}$ data that extends beyond the ending boundary of the FMU 1) being randomly stored in the non-volatile memory 124 non-sequentially relative to the front portion of the $1^{st}$ data (as opposed to sequentially stored in the non-volatile memory 124), which further reduces the write performance of the storage device 120.

Now assume that very shortly after issuing the $1^{st}$ write command, the host 102 issues another write command to the storage device 120 specifying that the host 102 wants to write an additional 8192 byes of data (or equivalently, an additional sixteen LBAs worth of data), starting at LBA 17. Such a write command, for the purpose of labeling and discussion, is shown in FIG. 6 and referred to as a $2^{nd}$ write command ($2^{nd}$ w-cmd). As can be appreciated from FIG. 6, since the $2^{nd}$ write command requested that data (referred to in this discussion as the $2^{nd}$ data) be written to LBAs 17 though 32, which are unaligned with the boundaries of the FMUs, this $2^{nd}$ write command is also an unaligned write command. More specifically, it can be seen in FIG. 6 that the start of the $2^{nd}$ data is offset from a starting boundary of FMU 2 by one LBA, and the end of the $2^{nd}$ data is offset from the boundary between FMUs 3 and 4 by one LBA. These exemplary $1^{st}$ and $2^{nd}$ write commands, which are consecutive unaligned write commands, are examples of unaligned sequential writes. As will be described in more detail below, such unaligned sequential writes can adversely affect write performance, if not handled appropriately.

In order to reduce the size, cost and complexity of a storage device, many storage devices, such as the storage device 120, do not include a command queue in RAM (volatile memory) that can be used to temporarily store a command received from a host until after a next command is received from the host. In other words, the controller 122 is not configured to store a write command (e.g., the $1^{st}$ write command) received from the host 102 in the controller RAM 206 for a period of time that extends until after a next write command (e.g., the $2^{nd}$ write command) is received from the host 102. Thus, the controller 122 cannot wait to begin storing the data associated with a write command (e.g., the $1^{st}$ write commend) in the non-volatile memory 124 until after the next write command (e.g., the $2^{nd}$ write command) is received.

Conventionally, when a memory controller (e.g., 122) receives consecutive unaligned write commands, such as the exemplary $1^{st}$ and $2^{nd}$ write commands discussed above with reference to FIG. 6, the controller will store the $1^{st}$ and $2^{nd}$ data (associated, respectively, with the $1^{st}$ and $2^{nd}$ write commands) non-sequentially relative to each other in physical memory, even if the LBAs in which the host wanted to save the $2^{nd}$ data (as specified by the $2^{nd}$ write command) immediately follow the LBAs in which the host wanted to save the $1^{st}$ data (as specified by the $1^{st}$ write command) In fact, the controller may even store a tail portion of the $1^{st}$ data non-sequentially relative a front portion of the $1^{st}$ data, and the controller may also store a tail portion of the $2^{nd}$ data non-sequentially relative to a front portion of the $2^{nd}$ data. Continuing with the above example, assume again that the host issued a $1^{st}$ write command to write 8192 byes of data (referred to as $1^{st}$ data) in LBAs 1 though 16, and thereafter issued a $2^{nd}$ write command to write an additional 8192 bytes of data (referred to as $2^{nd}$ data) in LBAs 17-32. For the reasons explained above, such $1^{st}$ and $2^{nd}$ write commands are examples of consecutive unaligned sequential write commands. If the controller 122 is not optimized to deal with such consecutive unaligned sequential write commands (that the host actually wants written sequentially), the following may occur. The controller 122, after receiving the $1^{st}$ write command may store the front portion of the $1^{st}$ data after performing pre-padding, then store the tail portion of the $1^{st}$ data randomly (i.e., non-sequentially relative the front portion of the $1^{st}$ data) in the non-volatile memory 124 after performing post-padding. Then after receiving the $2^{nd}$ write command, the controller 122 may store the front portion of the $2^{nd}$ data (after performing pre-padding) in the non-volatile memory 124 non-sequentially relative to any portion of the $1^{st}$ data, and then store the tail portion of the $2^{nd}$ data randomly (i.e., non-sequentially relative the front portion of the $2^{nd}$ data) in the non-volatile memory 124. This would result in both fragmentation of the $1^{st}$ and $2^{nd}$ data, as well as significant write amplification, both of which are undesirable.

Certain embodiments of the present technology, as will be described below, relate to techniques that a memory controller (e.g., 122) can use to reduce and preferably minimize fragmentation and write amplification, when the controller (e.g., 122) receives two or more consecutive unaligned sequential write commands (such as the exemplary $1^{st}$ and $2^{nd}$ write commands discussed above with reference to FIG. 6) from a host where the LBAs corresponding to the $2^{nd}$ write command immediately follow the LBAs corresponding to the $1^{st}$ write command Such embodiments will initially be described with reference to FIGS. 1 and 6, and will thereafter be summarized with reference to the high level flow diagram of FIG. 7.

Referring to FIG. 6, in accordance with an embodiment of the present technology, when the memory controller 122 receives a write command from the host 102, the controller 122 determines whether the write command is an unaligned write command, or more generally, whether pre-padding and/or post-padding of data to be written (in response to the write command) will be required before the data can be stored in non-volatile memory 124. As noted above, a write command may be an unaligned write command because it specifies that data is to be written such that the start of the data will be unaligned with a boundary of one of the FMUs (because the initial LBA specified in the write command is unaligned with any FMU boundary), and/or because the write command specifies that data is to be written such that the end of the data will be unaligned with a boundary of one of the FMUs. The $1^{st}$ write command that specifies that the Pt data (shown in FIG. 6) includes 8192 bytes and is to be stored in the non-volatile memory 124 starting LBA 1 (i.e., the $1^{st}$ initial LBA is LBA 1) is an example of an unaligned write command because both the start of the $1^{st}$ data will be unaligned with an FMU boundary, and the end of the $1^{st}$ data will be unaligned with an FMU boundary.

Since the start of the $1^{st}$ data is to be stored in non-volatile memory beginning at LBA 1, and thus will be unaligned the beginning boundary of the FMU 0, then pre-padding must be performed before the start of the $1^{st}$ data can be stored in non-volatile memory beginning at LBA 1. Further, since the end of the $1^{st}$ data will be unaligned with the ending boundary of the FMU 1 (or equivalently, unaligned with the beginning boundary of the FMU 2), then post-padding must be performed before the ending portion of the 1st data (which can also be referred to as the tail portion of the $1^{st}$ data, or more succinctly as the tail of the $1^{st}$ data) can be stored in non-volatile memory (regardless of whether the tail of the $1^{st}$ data is stored sequentially or non-sequentially relative to a front portion of the $1^{st}$ data). In accordance with the embodiments of the present technology described herein, the data that is used to pre-pad the $1^{st}$ data can be dummy data, or as will be appreciated from the below discussion, may be tail data associated with an immediately preceding write command. Further, in accordance with the embodiments of the present technology described herein, the data that is used to post-pad the $1^{st}$ data can be dummy data, or as will be appreciated from the below discussion, may be a front portion of $2^{nd}$ data to be stored in response to a next (i.e., immediately following) write command, which can be referred to as the $2^{nd}$ write command. In other words, in accordance with embodiments of the present technology, the tail of the $1^{st}$ data can be beneficially used to pre-pad the front portion of the $2^{nd}$ data, as will be appreciated from the following discussion. This can be used to both reduce fragmentation and write amplification. In the embodiments described herein, the size of a tail portion of data that is temporarily stored in volatile memory (e.g., the controller RAM 206) will be less than the size of an FMU.

It is noted that storing data in non-volatile memory in (or at) an LBA, as the phrase is used herein, means that the data is stored in the non-volatile memory in (or at) the physical address to which the LBA is mapped. Further, it is noted that the phrases storing data "in" an LBA, and storing data "at" an LBA, are used interchangeably herein. Further, the phrases storing data "in" a physical address of non-volatile memory, and storing data "at" a physical address of non-volatile memory, are used interchangeably herein.

In accordance with certain embodiments of the present technology, the memory controller 122, in response to determining that an end of the $1^{st}$ data will be unaligned with a boundary of one of the FMUs, stores a front portion of the $1^{st}$ data in the non-volatile memory 124 beginning at a physical block address (PBA) that corresponds to the first initial LBA specified by the $1^{st}$ write command (after pre-padding the $1^{st}$ data), and stores a tail portion of the $1^{st}$ data in volatile memory associated with the controller. The volatile memory in which the tail portion is stored can be the controller RAM 206 shown in FIG. 1, and more specifically, can be a portion of the controller RAM 206 that is designated for use as one or more transfer RAM (TRAM) buffer(s) 218, as shown in FIG. 2.

Thereafter, if the memory controller 122 receives a next write command (which will be referred as a $2^{nd}$ write command) within a predetermined amount of time (also referred to as a threshold amount of time), then the memory controller 122 will determine whether the $2^{nd}$ write command was intended by the host 102 to cause the $2^{nd}$ data to be stored in the non-volatile memory 124 sequentially relative to the $1^{st}$ data. For example, if controller 122 determined from the $1^{st}$ write command that the host 102 wanted the $1^{st}$ data to be written to LBAs 1 though 16, and thereafter (after receiving the $2^{nd}$ write command) the controller 122 determined from the $2^{nd}$ write command that the host 102 wanted the $2^{nd}$ data to be written starting at LBA 17 (or more specifically, to LBAs 17 though 32), then the controller 122 can determine from the $2^{nd}$ write command that the host 102 wanted to store the $2^{nd}$ data in the non-volatile memory 124 sequentially relative to the $1^{st}$ data (and thus, as a large continuous block of data). The above mentioned threshold amount of time can correspond to the amount of time that the controller 122 will store a tail portion of data in the controller RAM 206 (and more specifically, the TRAM buffer 218), before initiating the storing of the tail portion of data (being temporarily stored within the TRAM buffer 218) in the non-volatile memory 124. In accordance with an embodiment, this threshold amount of time can be equal to the Idle Time Garbage Collection (ITGC) time, but is not limited thereto. The reason for initiating the storing of the tail portion of data (being temporarily stored within the TRAM buffer 218 of the controller RAM 206) in the non-volatile memory 124, if a next command is not received within the threshold amount of time, is to reduce the chance of losing the tail portion of the data in the event of power to the storage device 120 being lost or turned off.

In accordance with embodiments of the present technology, the memory controller 122, in response to determining that the $2^{nd}$ data is to be stored sequential to the $1^{st}$ data, pre-pads the front portion of the $2^{nd}$ data with the tail portion of the $1^{st}$ data (which was being stored in the controller RAM 206, and more specifically the TRAM buffer 218), and then the controller 122 stores the tail portion of the $1^{st}$ data together with a front portion of the $2^{nd}$ data in the non-volatile memory 124 sequentially relative to the front portion of the $1^{st}$ data that was stored in the non-volatile memory 124 (during the preceding write cycle). This has a number of benefits. As noted above, this reduces both fragmentation and write amplification. Further, this allows the host 102, at a later point in time, to read the $1^{st}$ and $2^{nd}$ data sequentially, and thus, as one large continuous chunk of data from physical blocks of the non-volatile memory 124, which will improve read performance.

In the above discussed example, it was assumed that the next command that the memory controller 122 received from the host 102 after the $1^{st}$ write command was also a write command (i.e., the $2^{nd}$ write command), that the memory controller 122 determined from the $2^{nd}$ write command that the host 102 wanted to store the $2^{nd}$ data in the non-volatile memory 124 sequentially relative to the $1^{st}$ data, and that the $2^{nd}$ write command was received within the threshold amount of time. If the memory controller 122 had instead determined from the $2^{nd}$ write command that the host 102 did not want to store the $2^{nd}$ data in the non-volatile memory 124 sequentially relative to the $1^{st}$ data, then the tail portion of the $1^{st}$ data (which was being stored in the controller RAM 206, and more specifically the TRAM buffer 218) would instead be post-padded (e.g., with dummy data) and then randomly stored by the memory controller 122 within the non-volatile memory 124, such that the tail portion of the 1st data was not sequential relative to the front portion of the 1st data that had been stored at LBAs 1 though 15 as shown in FIG. 6 (and more specifically, at the physical addresses to which LBAs 1 through 15 are mapped).

Similarly, if the next command was instead a read command received within the threshold amount of time, then the tail portion of the $1^{st}$ data (which was being stored in the controller RAM 206, and more specifically the TRAM buffer 218) would instead be post-padded (e.g., with dummy data) and then randomly stored by the memory controller 122 within the non-volatile memory 124, such that the tail portion of the $1^{st}$ data was not sequential relative to the front portion of the $1^{st}$ data that had been stored at LBAs 1 though 15 as shown in FIG. 6 (and more specifically, at the physical addresses to which LBAs 1 through 15 are mapped).

Similarly, if a next command was not received within the threshold amount of time, then then the tail portion of the $1^{st}$ data (which was being stored in the controller RAM 206, and more specifically the TRAM buffer 218) would instead be post-padded (e.g., with dummy data) and then randomly stored by the memory controller 122 within the non-volatile memory 124, such that the tail portion of the $1^{st}$ data was not sequential relative to the front portion of the $1^{st}$ data that had been stored at LBAs 1 though 15 as shown in FIG. 6 (and more specifically, at the physical addresses to which LBAs 1 through 15 are mapped).

Figure 7:
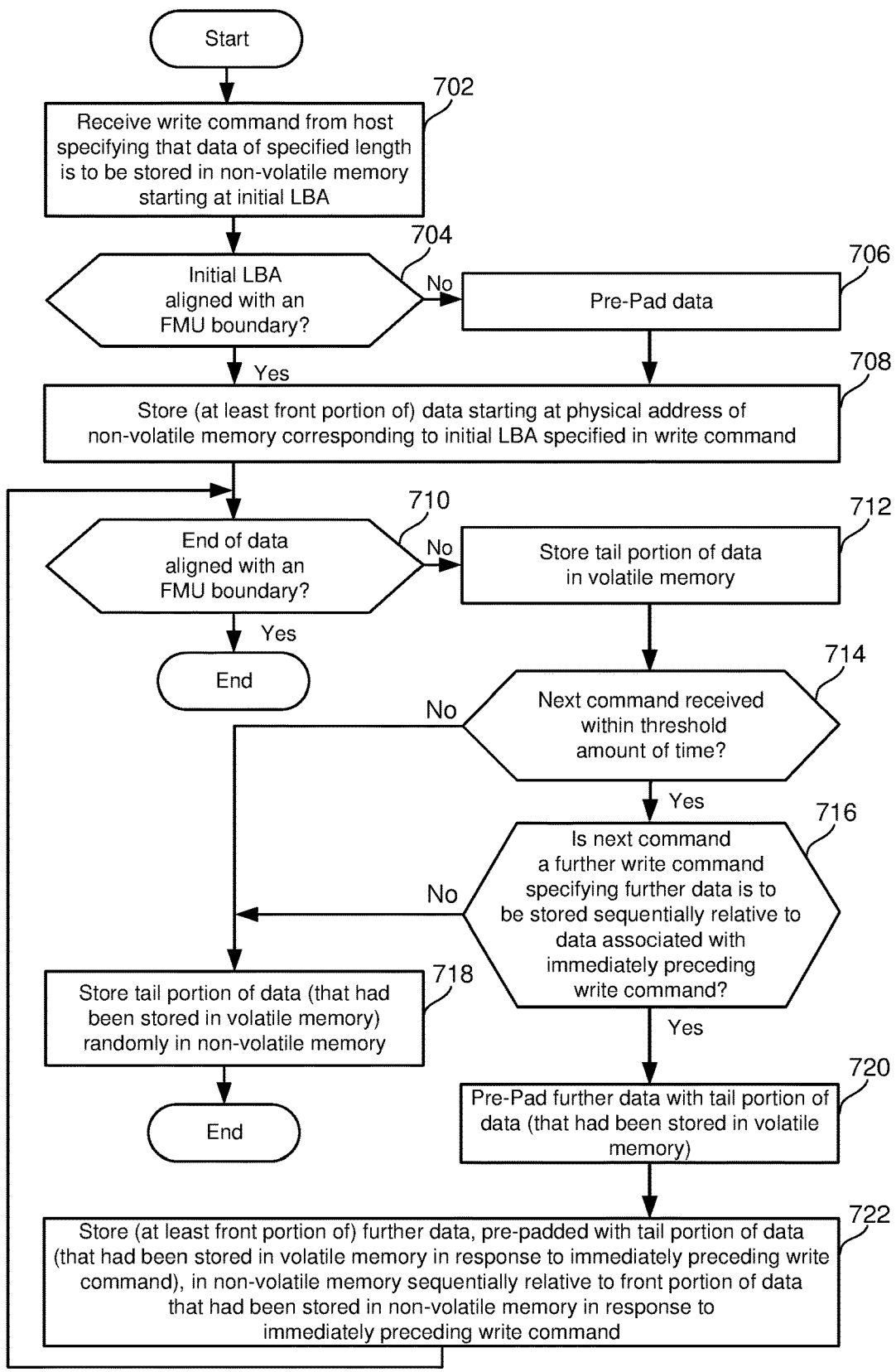
FIG. 7 is a high level flow diagram that is used to summarize methods for managing a storage device according to various embodiments of the present technology.

The high level flow diagram of FIG. 7 will now be used to summarize methods according to various embodiments of the present technology. Such methods can be used by the memory controller (e.g., 122) of a storage device (e.g., 120), wherein the storage device includes non-volatile memory (e.g., 124) and from the perspective of an FTL of the memory controller (e.g., 122) the non-volatile memory is logically organized into logical groups (LGs) that are each logically separated into a predeterminate number of flash management units (FMUs). Further, each of the FMUs is logically separated into a predetermined number of logical sub-units that are each addressable by a corresponding one of a plurality logical block addresses (LBAs), wherein each of the LBAs is mapped to one of a plurality of physical block addresses (PBAs). As was described above with reference to FIG. 1, the memory controller (e.g., 122) can also have volatile memory (e.g., controller RAM 206) associated with it.

Referring to FIG. 7, step 702 involves receiving a write command from a host that specifies that data of a specified length is to be written starting at an initial LBA. For the sake of this discussion, the write command received at step 702 can be referred to as a $1^{st}$ write command that specifies that $1^{st}$ data is to be written starting at a $1^{st}$ initial LBA. Further, continuing with the above example, it can be assumed that the $1^{st}$ write command specifies that the $1^{st}$ initial LBA is LBA 1, and that the length of the $1^{st}$ data is 8192 byes of data (or equivalently, sixteen LBAs worth of data).

Step 704 involves determining whether the initial LBA, specified by the write command received at step 702, corresponds to one of the FMU boundaries. If it is determined at step 704 that the initial LBA is indeed aligned with an FMU boundary, then at least a front portion of the data is stored at step 708 starting at a physical address of non-volatile memory corresponding to the initial LBA specified by the write command received at step 702. If it is instead determined at step 704 that the initial LBA is not aligned with an FMU boundary, then at step 706 the data is pre-padded (e.g., with dummy data), before at least a front portion of the data is stored at step 708 starting at a physical address of non-volatile memory corresponding to the initial LBA specified by the write command received at step 702. Continuing with the above example, since LBA 1 is not aligned with an FMU boundary, as can be appreciated from FIG. 6, then the $1^{st}$ data is pre-padded before at least the front portion of the $1^{st}$ data is stored starting at the physical address of non-volatile memory corresponding to the $1^{st}$ initial LBA (i.e., LBA 1) specified by the $1^{st}$ write command. At the same time, the pre-pad data (e.g., dummy data) is stored at a physical address of the non-volatile memory corresponding to LBA 0, since a partial FMU cannot be written to.

Still referring to FIG. 7, at step 710 there is a determination of whether an end of the data will be aligned with an FMU boundary, because if it will not be, the data will need to be post-padded, since as noted above, a partial FMU cannot be written to. If it is determined that the end of the data is aligned with an FMU boundary, then the process ends, as shown in FIG. 7. (Thereafter, when another write command is received, the process again begins with step 702). However, if it is determined at step 710 that the end of the data is not aligned with an FMU boundary, then the tail portion of the data (which follows the front portion of the data) is stored in volatile memory associated with the memory controller, e.g., in the controller RAM 206, or more specifically, in the TRAM buffer(s) 218, discussed above with reference to FIG. 2. Continuing with the above example, since the end of the $1^{st}$ data would not be aligned with an FMU boundary, then the tail portion of the $1^{st}$ data would be stored in volatile memory (e.g., 206) associated with the memory controller (e.g., 122). While steps 710 and 712 are shown after step 708 in FIG. 7, these steps may actually be performed prior to step 708, e.g., simultaneous with steps 704 and 706, respectively, or between steps 704 and 708, but not limited thereto. The reason for saving the tail portion of the data in volatile memory, is to see if the tail portion of the data can be used to pre-pad further data to be written in response to a next write command.

Still referring to FIG. 7, at step 714 there is a determination of whether a next command is received by the memory controller (e.g., 122) from the host (e.g., 120) within a threshold amount of time. As noted above, this threshold amount of time can be equal to the Idle Time Garbage Collection (ITGC) time, but is not limited thereto. If a next command is not received within the threshold amount of time, then at step 718 the tail portion of the data (that was stored in the volatile memory at step 712) is randomly stored in the non-volatile memory, such that the tail portion of the data is stored non-sequentially relative the front portion of the data that was stored at step 708. Although not specifically shown in the flow diagram of FIG. 7, the tail portion should be post-padded, e.g., with dummy data, before being stored randomly, since a partial FMU cannot be written to. The reason for not simply leaving the tail within the volatile memory indefinitely while waiting to receive a next command is to reduce the chance of losing the tail portion of the data in the event that power to the storage device (e.g., 120) is lost or turned off, in which case any data stored solely in volatile memory, including but not limited to the tail portion of the data, would be lost. Continuing with the above example, if the memory controller (e.g., 122) did not receive a $2^{nd}$ write command from the host (e.g., 120) within the threshold amount of time since the $1^{st}$ write command was received from the host, then the tail portion of the $1^{st}$ data would be stored, with post-pad data, non-sequentially relative to where the front portion of the $1^{st}$ data was stored in the non-volatile memory (e.g., 124) at step 708.

If a next command is indeed received within the threshold amount of time, then at step 716 there is a determination of whether the next command is a further write command specifying that further data is to be stored sequentially relative to the data that the host wanted stored in response to the immediately preceding write command. If there is a determination at step 716 that the next command is not a further write command in which the host wants further data stored sequentially relative to the data the host wanted written in response to the immediately preceding write command (i.e., the write command received at step 702), then at step 718 the tail portion of the data (that was stored in the volatile memory at step 712) is randomly stored in the non-volatile memory, such that the tail portion of the data is stored non-sequentially relative the front portion of the data that was stored at step 708. As noted above, although not specifically shown in the flow diagram of FIG. 7, the tail portion should be post-padded, e.g., with dummy data, before being stored randomly, since a partial FMU cannot be written to. This logical flow from step 716 to step 718 may occur where the next command is a read command. This logical flow from step 716 to step 718 may alternatively occur where the next command is a further write command, but is a non-sequential write command (in which the host indicated that the next data is to be stored non-sequential relative to the data to be stored in the immediately preceding write command) Thereafter, when another write command is received, the process again begins with step 702.

If there is a determination at step 716 that the next command received by the memory controller from the host is indeed a further write command to store further data sequentially relative to where the host most recently wanted data stored in response to the immediately preceding write command (received at step 702), then at step 718 the tail portion of the data (that was stored in the volatile memory at step 712) is used to pre-pad the further data at step 720. In other words, flow goes from step 716 to step 720 when the next write command is an unaligned sequential write command relative to the previous unaligned write command received at step 702. Then at step 722, at least a front portion of the further data, pre-padded with the tail portion of the data (that was stored in the volatile memory at step 712), is stored in the non-volatile memory (e.g., 124) sequentially relative to the front portion of the data that had been stored in the non-volatile memory (at step 708) in response to the immediately preceding write command (received at step 702). Continuing with the above example introduced with reference to FIG. 6, this will result in the tail portion of the $1^{st}$ data being stored sequentially in the non-volatile memory relative to where the front portion of the $1^{st}$ data had been stored in the non-volatile memory (in the preceding write cycle), and the front portion of the $2^{nd}$ data being stored sequentially following the tail portion of the $1^{st}$ data (and thus sequentially relative to the entirety of $1^{st}$ data) in the non-volatile memory. As shown in FIG. 7, flow thereafter goes back to step 710, and there is a determination of whether there is still a tail portion of the further data (the $2^{nd}$ data in the example) that needs to be dealt with. More specifically, at an instance of step 710 that follows step 722 (or that occurs simultaneous with or just before step 722), there is a determination of whether an end of the further data (e.g., the $2^{nd}$ data) is aligned with an FMU boundary. If the answer to the determination at step 710 is no, then a tail portion of the further data is stored in volatile memory at a further instance of step 712. Depending upon when and what command is received next from the host, then the tail portion of the further data (e.g., a tail portion of the $2^{nd}$ data associated with a $2^{nd}$ write command) may be either be post-padded and stored randomly in the non-volatile memory (at an instance of step 718), or (at further instances of steps 720 and 722) may be used to pre-pad still further data (e.g., $3^{rd}$ data to be stored in response to a $3^{rd}$ write command received from the host) and stored in the non-volatile memory sequentially relative to the front portion of the further data (e.g., the front portion of the $2^{nd}$ data) that was stored at the previous instance of step 722.

Figure 8:
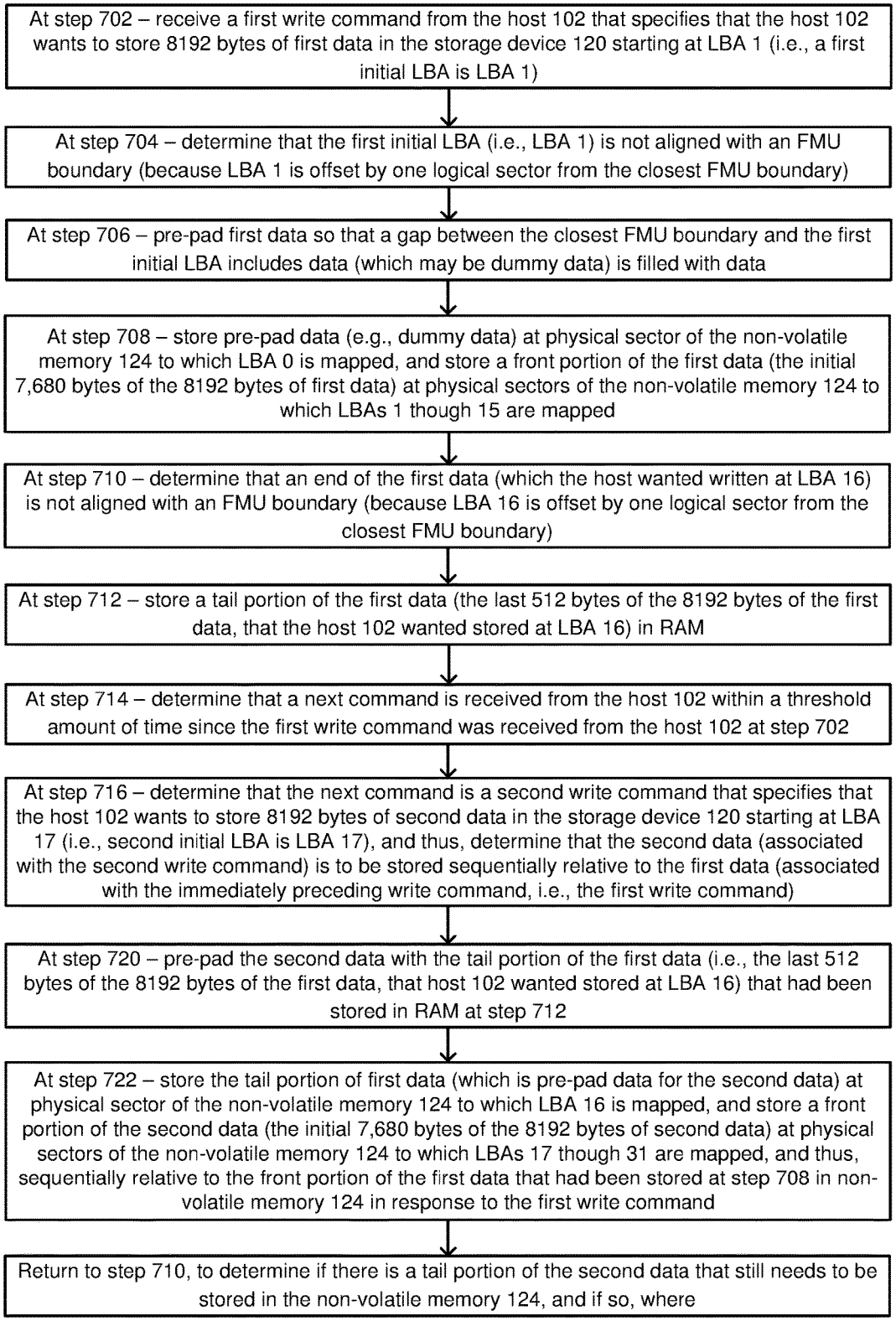
FIG. 8 is used to illustrate one potential path or flow through the high level flow diagram of FIG. 7.

FIG. 8 illustrates one potential path or flow through the high level flow diagram of FIG. 7, wherein the $1^{st}$ and $2^{nd}$ write commands received by a memory controller (e.g., 122) of a storage device (e.g., 120) are to unaligned sequential write commands received from a host (e.g., 102).

Figure 9:
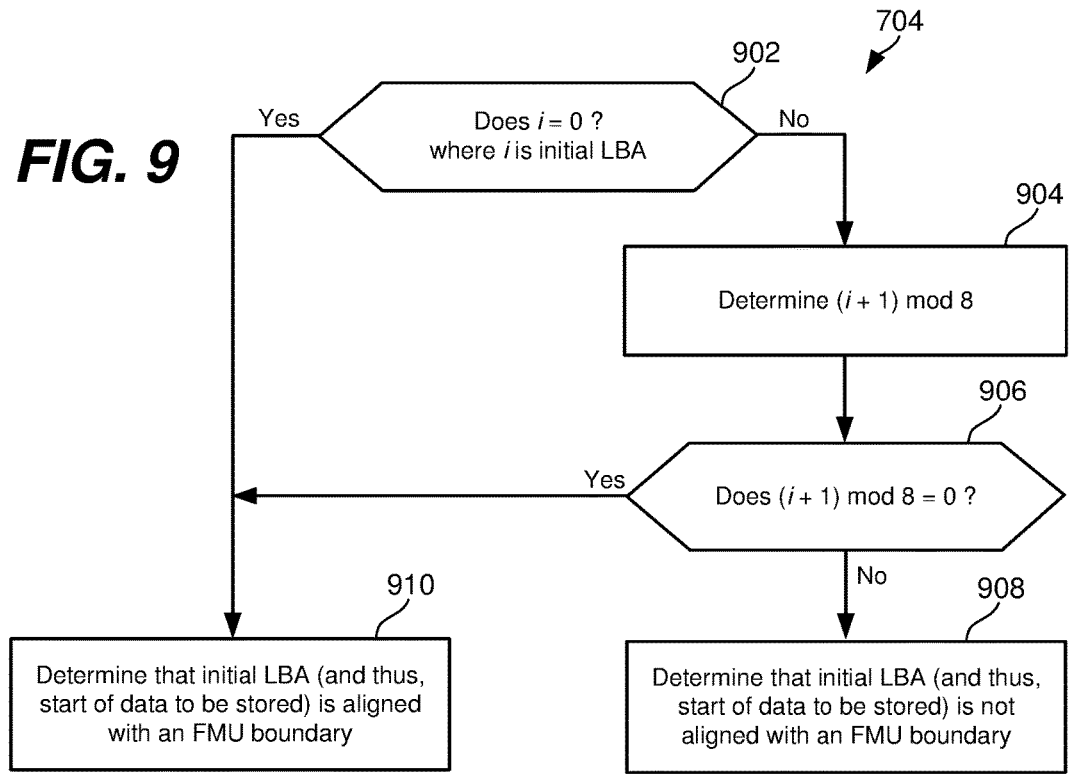
FIG. 9 is a flow diagram that provides additional details of how step 704, introduced in FIG. 7, can be performed.
Figure 10:
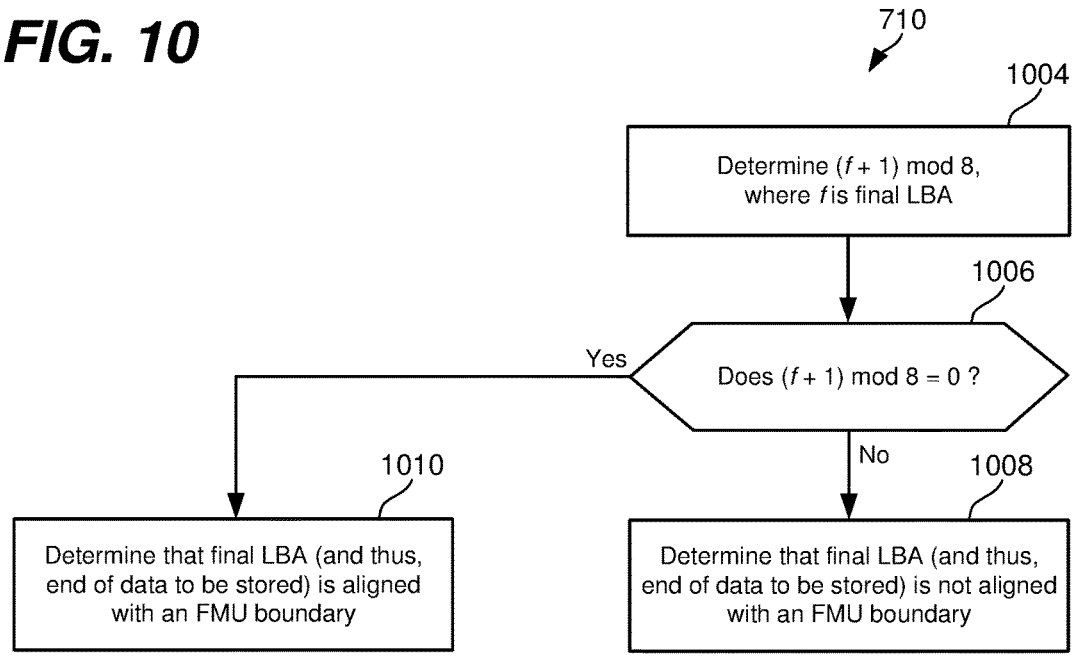
FIG. 10 is a flow diagram that provides additional details of how step 710, introduced in FIG. 7, can be performed.
Figure 11:
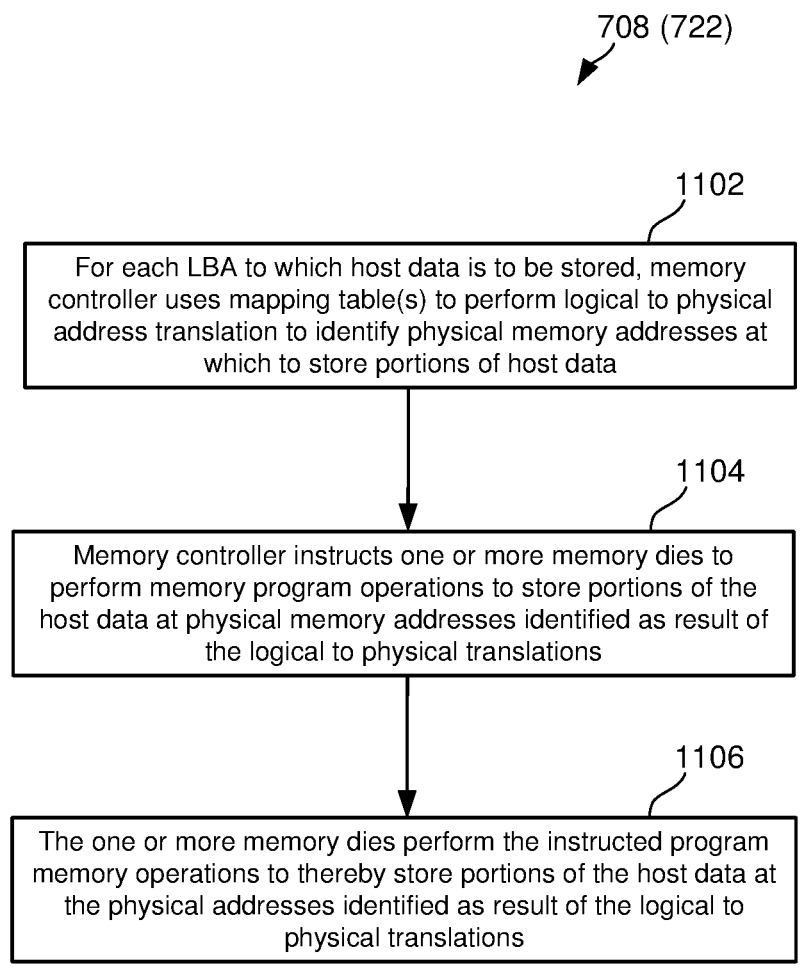
FIG. 11 is a flow diagram that provides additional details of how step 708 (as well as step 722), introduced in FIG. 11, can be performed.

FIGS. 9, 10 and 11 will now be used to provide additional details of how certain steps of the flow diagram of FIG. 7 can be implemented, in accordance with specific embodiments of the present technology. More specifically, FIG. 9 provides additional details of how step 704 can be performed, FIG. 10 provides additional details of how step 710 can be performed, and FIG. 11 provides additional details of how step 708 (as well as step 722) can be performed. The steps or functions performed in FIGS. 9, 10 and 11 can be performed by the memory controller 122.

FIG. 9 illustrates one way in which the memory controller 122 can determine, at step 704, whether an initial LBA (to which the host wants to write a chunk of data, as specified in a write command received from the host at step 702) is aligned with an FMU boundary. Referring to FIG. 9, at step 902 there is a determination of whether i=0, where i is the initial LBA. If i=0, then at step 910 it is determined that the initial LBA (and thus the start of the data to be stored in response to the write command) is aligned with an LBA boundary. If i does not equal 0, then at step 904 there is a determination of (i+1) mod 8, where mod is the modulo function, which finds the remainder after division of one number by another (sometimes referred to as the modulus). In this example, the modulus is 8. At step 906 there is a determination of whether (i+1) mod 8=0. If (i+1) mod 8=0, then it is determined at step 910 that the initial LBA (and thus the start of the data to be stored in response to the write command) is aligned with an LBA boundary. If (i+1) mod 8 does not equal 0, then it is determined at step 908 that the initial LBA (and thus the start of the data to be stored in response to the write command) is not aligned (i.e., is unaligned) with an LBA boundary.

FIG. 10 illustrates one way in which the memory controller 122 can determine, at step 710, whether an final LBA (the last LBA to which the host wants to write a chunk of data) is aligned with an FMU boundary. Referring to FIG. 10, at step 1004 there is a determination of (f+1) mod 8, where f is the value of the final LBA. At step 1006 there is a determination of whether (f+1) mod 8=0. If (f+1) mod 8=0, then it is determined at step 1010 that the final LBA (and thus the end of the data to be stored in response to the write command) is aligned with an LBA boundary. If (f+1) mod 8 does not equal 0, then it is determined at step 1008 that the final LBA (and thus the end of the data to be stored in response to the write command) is not aligned (i.e., is unaligned) with an LBA boundary.

FIG. 11 illustrates one way in which at step 708 the memory controller 122 can store (at least a front portion of) the host data starting at physical address of the non-volatile memory corresponding to initial LBA specified in write command. Referring to FIG. 10, at step 1102, for each LBA to which host data is to be stored in non-volatile memory, one or more logical to physical mapping tables (e.g., cached in the LTP cache 208 of the controller RAM 206) are used to perform a logical to physical address translation to identify physical memory addresses at which to store portions of the host data. At step 1104, the memory controller 1104 instructs one or more memory dies (e.g., 308) to perform memory program operations to store portions of the host data at the physical addresses identified as a result of the logical to physical translations performed at step 1102. At step 1106, the one or more memory dies (e.g., 308) perform the instructed program memory operations to thereby store portions of the host data at the physical addresses identified as a result of the logical to physical translations performed at step 1102.

Without using the embodiments of the present technology described herein with references to FIGS. 1 through 11 above, a storage device (e.g., 120) may experience poor write performance when responding to unaligned sequential write commands received from a host, such as or similar to the $1^{st}$ and $2^{nd}$ write commands discussed above with reference to FIG. 6. For example, without implementing embodiments of the present technology, tests have shown that write performance for a particular USB storage device dropped from approximately 150 Megabytes per second (MB/s) when responding to consecutive aligned sequential write commands, down to approximately 100 MB/s when responding to consecutive unaligned sequential write commands In other words, if unaligned sequential write commands are not handled appropriately, they can cause a reduction in write performance by over 30% for a storage device, compared to if the storage device was handling aligned sequential write commands Embodiments of the present technology reduce and preferably minimize the this drop off in write performance. Performance benchmarking tools such as, but not limited to, AmorphousDiskMark and CPU, Disk, Memory Performance Monitoring (cdm) tools can be used to measure write performance.

Embodiments of the present technology can be used to provide for write performance that is independent of alignment of write commands. Further, because the writing of random stream blocks is reduced and preferably minimized, endurance from random stream blocks is improved.

Certain embodiments of the present technology relate to a storage device comprising non-volatile memory, random access memory (RAM), and a controller in communication with the non-volatile memory and the RAM, and configured store data in the non-volatile memory in response to receiving write commands from a host. When the controller receives an unaligned write command specifying that data is to be stored in the non-volatile memory starting at a logical address that is unaligned with a logical unit boundary, the controller stores a front portion of the data in the non-volatile memory such that an end of the front portion of the data is aligned with a logical unit boundary, and stores a tail portion of the data in the RAM. If the controller receives a next command within a threshold amount of time and determines that the next command is a further unaligned write command specifying that the host wants to store further data sequentially relative to the data associated with the immediately preceding write command, then the controller uses the tail portion of the data that was stored in the RAM as a result of the immediately preceding write command to pre-pad a front portion of the further data, and stores the tail portion of the data and at least the front potion of the further data sequentially relative to the front portion of the data that was stored in the non-volatile memory responsive to immediately preceding unaligned write command. The logical unit may specify a smallest data chunk size that the host can write to or read from the non-volatile memory, with each logical unit having two logical unit boundaries, including a starting logical unit boundary and an ending logical unit boundary.

In accordance with certain embodiments, when the controller stores the front portion of the data in the non-volatile memory such that the end of the front portion of the data is aligned with a logical unit boundary, the controller also pre-pads the front portion of the data. The tail portion of the data, which the controller stores in the RAM, is a portion of the data that extends beyond the end of the front portion of the data that is aligned with a said logical unit boundary.

In accordance with certain embodiments, the controller is not configured to store a write command received from the host in the RAM for a period of time that extends until after a next command is received from the host, and thus, the controller cannot wait to begin storing the data associated with the write command in the non-volatile memory until after the next command is received.

In accordance with certain embodiments, if the controller does not receive a next command within the threshold amount of time, then the controller randomly stores the tail portion of the data, that was being stored in the RAM, in the non-volatile memory such that the tail portion of the data is stored in the non-volatile memory non-sequentially relative to where the front portion of the data was stored in the non-volatile memory. Similarly, if the controller receives a next command within the threshold amount of time and determines that the next command is a read command, then the controller randomly stores the tail portion of the data, that was being stored in the RAM, in the non-volatile memory such that the tail portion of the data is stored in the non-volatile memory non-sequentially relative to where the front portion of the data was stored in the non-volatile memory. When the controller randomly stores the tail portion of the data, the controller also stores post-pad dummy data following the tail portion of the data so that an entire logical unit is written to.

From the perspective of an FTL of the controller the non-volatile memory of the storage device is organized into logical groups (LGs) that are each separated into a predetermine number of the logical units, and wherein each of the logical units is separated into a predetermined number of logical sub-units that each correspond to one of a plurality logical block address (LBAs). The controller maintains one or more tables that the controller uses to map LBAs to physical memory addresses within the non-volatile memory to thereby perform logical to physical memory translations. Each write command received by the controller from the host specifies an initial LBA to which data associated with the write command is to begin being stored. The controller can be configured to use the initial LBA specified by a write command to classify the write command is one of an aligned write command or an unaligned write command. Further, the controller can be configured to use the initial LBA specified by a write command to determine whether or not at least a front portion of data associated with the write command is to be stored in the non-volatile memory sequentially relative to data previously stored in the non-volatile memory in response to an immediately preceding write command.

Certain embodiments of the present technology are related to methods for use by a memory controller that receives commands from a host and that is in communication with non-volatile memory, wherein from a perspective of an FTL of the memory controller the non-volatile memory is logically organized into logical groups (LGs) that are each logically separated into a predetermine number of flash management units (FMUs), wherein each of the FMUs is logically separated into a predetermined number of logical sub-units that are each addressable by a corresponding one of a plurality logical block addresses (LBAs). Each of the FMUs can, e.g., correspond to 4096 bytes and be separated into eight 512 byte logical sub-units, but are not limited thereto. Such a method can comprise the memory controller receiving a first write command from a host that specifies that first data is to be written starting at a first initial logical block address (LBA). The method can also include, in response to determining that an end of the first data will be unaligned with a boundary of one of the FMUs, storing a front portion of the first data in the non-volatile memory beginning at a physical address that corresponds to the first initial LBA specified by the first write command, and storing a tail portion of the first data in volatile memory associated with the controller. The method can further include receiving a second write command from the host that specifies that second data is to be written starting at a second initial LBA, the receiving occurring while the tail portion of the first data is still being stored in the volatile memory associated with the controller and has not yet been stored in the non-volatile memory. The method can also include in response to determining that the second data is sequential to the first data, pre-padding the second data with the tail portion of the first data stored in the volatile memory associated with the controller, and after the pre-padding storing the tail portion of the first data together with at least a front portion of the second data in the non-volatile memory sequentially relative to the front portion of the first data that was stored in the non-volatile memory.

In accordance with certain embodiments, the method includes, in response to determining that the first initial LBA specified by the first write command is unaligned with a boundary of the FMU including the logical sub-unit to which the first initial LBA corresponds, pre-padding the first data before storing the front portion of the first data in the non-volatile memory.

In accordance with certain embodiments, the method includes, in response to determining that an end of the second data to be written will be unaligned with a boundary of one of the FMUs, storing a front portion of the second data in the non-volatile memory beginning at a physical address that corresponds to the second initial LBA specified by the second write command, and storing a tail portion of the second data in the volatile memory associated with the controller.

The method can also include the memory controller receiving a third write command from the host while the tail portion of the second data is still being store in the volatile memory associated with the controller and has not yet been stored within the non-volatile memory, wherein the third write command specifies that third data is to be written starting at a third initial LBA. In response to determining that the third data is not sequential to the second data, the method can include post-padding the tail portion of the second data stored in the volatile memory associated with the controller, and after the post-padding storing the tail portion of the second data randomly within the non-volatile memory, such that the tail portion of the second data is stored in the non-volatile memory non-sequentially relative to where the front portion of the second data was stored in the non-volatile memory. Similarly, if the next command is a read command (instead of a write command), or if a threshold period of time has elapsed without receiving a further command from the host after the second command was received, then the method can include post-padding the tail portion of the second data stored in the volatile memory associated with the controller, and then after the post-padding storing the tail portion of the second data randomly within the non-volatile memory, such that the tail portion of the second data is stored in the non-volatile memory non-sequentially relative to where the front portion of the second data was stored in the non-volatile memory.

In accordance with certain embodiments, the memory controller and the non-volatile memory are components of a storage device does not include a volatile memory command queue configured to store a write command received from the host for a period of time that extends until after a next command is received from the host, and thus, the memory controller cannot wait to begin storing the data associated with the write command in the non-volatile memory until after the next command is received.

Certain embodiments of the present technology relate to an apparatus including flash memory, random access memory (RAM), and a means for storing first data and at least a front portion of second data, corresponding respectively to consecutive unaligned first and second write commands received within a threshold amount of time of one another from a host, sequentially relative to one another within the flash memory. The means for storing can be, e.g., a memory controller, but is not limited thereto. Such a memory controller, or more generally the means for storing, can include a processor and instructions executed by the processor. In certain embodiments, the means for storing is configured to store a front portion of first data, corresponding to the first write command received from a host, in the flash memory starting at a logical address specified by the first write command. Additionally, the means for storing is configured to store a tail portion of the first data, which extends beyond a flash management unit boundary, in the RAM. Further, the means for storing is configured to store the front portion of second data, corresponding to the second write command received from the host within the threshold amount of time of the first write command being received, pre-padded with the tail portion of the first data that was stored in the RAM, in the flash memory sequentially relative to where the front portion of the data that was stored in the flash memory, in response to the means for storing determining from the second write command that the host wants the second data stored sequentially relative to the first data.

For the purpose of this document, the terms "write" and "store" are often used interchangeably, as are the terms "writing" and "storing."

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it. For example, previous write commands may have been received before a $1^{st}$ write command was received. However, it may be implied that a $2^{nd}$ write command is received at a later point in time than when a $1^{st}$ write command was received, as there terms are being used herein. Similarly, it can be implied that the a $3^{rd}$ write command was received after the $2^{nd}$ write command.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A storage device comprising:
   non-volatile memory;
   random access memory (RAM); and
   a controller in communication with the non-volatile memory and the RAM, and configured store data in the non-volatile memory in response to receiving write commands from a host;
   wherein when the controller receives an unaligned write command specifying that data is to be stored in the non-volatile memory starting at a logical address that is unaligned with a logical unit boundary, the controller stores a front portion of the data in the non-volatile memory prior to the controller receiving a next command from the host and such that an end of the front portion of the data is aligned with a logical unit boundary, and the controller stores a tail portion of the data in the RAM prior to the controller receiving the next command from the host and such that the tail portion of the data remains stored in the RAM for at least a period of time after which the front portion of the data has already been stored in the non-volatile memory;
   wherein if the controller receives the next command within a threshold amount of time and determines that the next command is a further unaligned write command specifying that the host wants to store further data sequentially relative to the data associated with the immediately preceding write command, then the controller uses the tail portion of the data that was stored in the RAM as a result of the immediately preceding write command to pre-pad a front portion of the further data, and stores the tail portion of the data and at least the front potion of the further data in the non-volatile memory sequentially relative to the front portion of the data that was stored in the non-volatile memory responsive to the immediately preceding unaligned write command.

2. The storage device of claim 1, wherein a said logical unit specifies a smallest data chunk size that the host can write to or read from the non-volatile memory, with each logical unit having two logical unit boundaries, including a starting logical unit boundary and an ending logical unit boundary.

3. The storage device of claim 1, wherein when the controller stores the front portion of the data in the non-volatile memory such that the end of the front portion of the data is aligned with a said logical unit boundary, the controller also pre-pads the front portion of the data.

4. The storage device claim 1, wherein the controller is not configured to store a write command received from the host in the RAM for a period of time that extends until after a next command is received from the host, and thus, the controller cannot wait to begin storing the data associated with the write command in the non-volatile memory until after the next command is received.

5. The storage device of claim 1, wherein if the controller does not receive a next command within the threshold amount of time, then the controller randomly stores the tail portion of the data, that was being stored in the RAM, in the non-volatile memory such that the tail portion of the data is stored in the non-volatile memory non-sequentially relative to where the front portion of the data was stored in the non-volatile memory.

6. The storage device of claim 5, wherein when the controller randomly stores the tail portion of the data, the controller also stores post-pad dummy data following the tail portion of the data so that an entire logical unit is written to.

7. The storage device of claim 1, wherein if the controller receives a next command within the threshold amount of time and determines that the next command is a read command, then the controller randomly stores the tail portion of the data, that was being stored in the RAM, in the non-volatile memory such that the tail portion of the data is stored in the non-volatile memory non-sequentially relative to where the front portion of the data was stored in the non-volatile memory.

8. The storage device of claim 7, wherein when the controller randomly stores the tail portion of the data, the controller also stores post-pad dummy data following the tail portion of the data so that an entire logical unit is written to.

9. The storage device of claim 1, wherein:
from a perspective of a flash translation layer (FTL) of the controller the non-volatile memory of the storage device is organized into logical groups (LGs) that are each separated into a predetermine number of the logical units, and wherein each of the logical units is separated into a predetermined number of logical sub-units that each correspond to one of a plurality logical block address (LBAs);
the controller maintains one or more tables that the controller uses to map LBAs to physical memory addresses within the non-volatile memory to thereby perform logical to physical memory translations;
each write command received by the controller from the host specifies an initial LBA to which data associated with the write command is to begin being stored;
the controller is configured to use the initial LBA specified by a write command to classify the write command is one of an aligned write command or an unaligned write command; and
the controller is configured to use the initial LBA specified by a write command to determine whether or not at least a front portion of data associated with the write command is to be stored in the non-volatile memory sequentially relative to data previously stored in the non-volatile memory in response to an immediately preceding write command.

10. The storage device of claim 1, wherein the tail portion of the data, which the controller stores in the RAM, is a portion of the data that extends beyond the end of the front portion of the data that is aligned with a said logical unit boundary.

11. A method for use by a memory controller that receives commands from a host and that is in communication with non-volatile memory, wherein from a perspective of a flash translation layer (FTL) of the memory controller the non-volatile memory is organized into logical groups (LGs) that are each logically separated into a predetermine number of flash management units (FMUs), wherein each of the FMUs is logically separated into a predetermined number of logical sub-units that are each addressable by a corresponding one of a plurality logical block addresses (LBAs), the method comprising the memory controller:
receiving a first write command from a host that specifies that first data is to be written starting at a first initial logical block address (LBA);
in response to determining that an end of the first data will be unaligned with a boundary of one of the FMUs, storing a front portion of the first data in the non-volatile memory beginning at a physical address that corresponds to the first initial LBA specified by the first write command prior to the receiving a next command from the host, and storing a tail portion of the first data in volatile memory associated with the controller prior to receiving the next command from the host and such that the tail portion of the data remains stored in the volatile memory for at least a period of time after which the front portion of the data has already been stored in the non-volatile memory;
receiving a second write command from the host that is the next command received from the host and specifies that second data is to be written starting at a second initial LBA, the receiving the second write command occurring while the tail portion of the first data is still being stored in the volatile memory associated with the controller and has not yet been stored in the non-volatile memory; and
in response to determining that the second data is sequential to the first data, pre-padding the second data with the tail portion of the first data stored in the volatile memory associated with the controller, and after the pre-padding storing the tail portion of the first data together with at least a front portion of the second data in the non-volatile memory sequentially relative to the front portion of the first data that was stored in the non-volatile memory responsive to the first write command.

12. The method of claim 11, further comprising the memory controller:
in response to determining that the first initial LBA specified by the first write command is unaligned with a boundary of the FMU including the logical sub-unit to which the first initial LBA corresponds, pre-padding the first data before storing the front portion of the first data in the non-volatile memory.

13. The method of claim 11, further comprising the memory controller:
in response to determining that an end of the second data to be written will be unaligned with a boundary of one of the FMUs, storing a front portion of the second data in the non-volatile memory beginning at a physical address that corresponds to the second initial LBA specified by the second write command, and storing a tail portion of the second data in the volatile memory associated with the controller.

14. The method of claim 13, further comprising the memory controller:
receiving a third write command from the host while the tail portion of the second data is still being store in the volatile memory associated with the controller and has not yet been stored within the non-volatile memory, wherein the third write command specifies that third data is to be written starting at a third initial LBA; and
in response to determining that the third data is not sequential to the second data, post-padding the tail portion of the second data stored in the volatile memory associated with the controller, and after the post-padding storing the tail portion of the second data randomly within the non-volatile memory, such that the tail portion of the second data is stored in the non-volatile memory non-sequentially relative to where the front portion of the second data was stored in the non-volatile memory.

15. The method of claim 13, further comprising the memory controller:
- receiving a read command from the host while the tail portion of the second data is still being stored in the volatile memory associated with the controller and has not yet been stored within the non-volatile memory; and
- in response to receiving the read command from the host while the tail portion of the second data is still being stored in the volatile memory associated with the controller and has not yet been stored within the non-volatile memory, post-padding the tail portion of the second data stored in the volatile memory associated with the controller, and after the post-padding storing the tail portion of the second data randomly within the non-volatile memory, such that the tail portion of the second data is stored in the non-volatile memory non-sequentially relative to where the front portion of the second data was stored in the non-volatile memory.

16. The method of claim 13, further comprising the memory controller:
- in response to determining that a threshold period of time has elapsed without receiving a further command from the host after the second command was received, post-padding the tail portion of the second data stored in the volatile memory associated with the controller, and after the post-padding storing the tail portion of the second data randomly within the non-volatile memory, such that the tail portion of the second data is stored in the non-volatile memory non-sequentially relative to where the front portion of the second data was stored in the non-volatile memory.

17. The method of claim 11, wherein each of the FMUs corresponds to 4096 bytes and is separated into eight 512 byte logical sub-units.

18. The method of claim 11, wherein the memory controller and the non-volatile memory are components of a storage device does not include a volatile memory command queue configured to store a write command received from the host for a period of time that extends until after a next command is received from the host, and thus, the memory controller cannot wait to begin storing the data associated with the write command in the non-volatile memory until after the next command is received.

19. An apparatus, comprising:
flash memory;
random access memory (RAM); and
a means for storing first data and at least a front portion of second data, corresponding respectively to consecutive unaligned first and second write commands received within a threshold amount of time of one another from a host, sequentially relative to one another within the flash memory,
wherein the means for storing is configured to
store a front portion of first data, corresponding to the first write command received from the host, in the flash memory starting at a logical address specified by the first write command prior to the second write command being received;
store a tail portion of the first data, which extends beyond a flash management unit boundary, in the RAM prior to the second write command being received and such that the tail portion of the first data remains stored in the RAM for at least a period of time after which the front portion of the first data has already been stored in the flash memory; and
store the front portion of second data, corresponding to the second write command received from the host within the threshold amount of time of the first write command being received, pre-padded with the tail portion of the first data that was stored in the RAM, in the flash memory sequentially relative to where the front portion of the first data that was stored in the flash memory, in response to the means for storing determining from the second write command that the host wants the second data stored sequentially relative to the first data.

* * * * *